US012783910B2

(12) United States Patent
Hubbard et al.

(10) Patent No.: US 12,783,910 B2
(45) Date of Patent: Nov. 3, 2026

(54) CROSS-DOMAIN ONTOLOGY MODEL VISUALIZATION SYSTEM WITH WORLD METAPHOR ORTHOGRAPHY

(71) Applicant: The Boeing Company, Chicago, IL (US)

(72) Inventors: William E. Hubbard, Manassas, VA (US); Michael C. Richey, Camano Island, WA (US)

(73) Assignee: The Boeing Company, Arlington, VA (US)

( * ) Notice: Subject to any disclaimer, the term of this patent is extended or adjusted under 35 U.S.C. 154(b) by 1072 days.

(21) Appl. No.: 17/936,383

(22) Filed: Sep. 28, 2022

(65) Prior Publication Data

US 2024/0104399 A1 Mar. 28, 2024

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS

| | | | | |
|---|---|---|---|---|
| 10,157,226 | B1 * | 12/2018 | Costabello | G06N 5/022 |
| 2019/0188332 | A1 * | 6/2019 | Ingvaldsen | G06F 16/9024 |
| 2020/0380377 | A1 * | 12/2020 | Trim | G06F 18/2185 |
| 2021/0358601 | A1 * | 11/2021 | Pillai | G16H 40/20 |
| 2023/0297851 | A1 * | 9/2023 | Sbodio | G06F 16/951 |

OTHER PUBLICATIONS

Ennajari et al., "Combining Knowledge Graph and Word Embeddings for Spherical Topic Modeling," Sep. 24, 2021 (Year: 2021).*

Muhlmeyer et al., "Information Spread in a Social Media Age" (Year: 2021).*

Author: Richard Halliger Title: Addendum v051 pp. 64 pages Date of first publication: May 13, 2022 Place of first publication: United States Evidence of publication: pp. 65-83.

Author: Richard Halliger Title: Digital Engineering Traceability v007 pp. 11 pages Date of first publication: Jul. 20, 2021 Place of first publication: United States Evidence of publication: pp. 10-13.

Title: PSM Digital Engineering Measurement Framework v1.1 Author: Richard Halliger pp. 1, 2 38, and 68 Date of first publication: Jun. 21, 2022 Place of first publication: "Practical Software and Systems Measurement (PSM) Digital Engineering Measurement Framework v1.1", Web page https://www.psmsc.com/Downloads/DEPaper/DE%20Measurement%20Framework%20ver%201.1%20202022-07-27%20final.pdf, retrieved from https://www.psmsc.com/DEMeasurement.asp on Aug. 19, 2024 Evidence of publication: See https://www.psmsc.com/DEMeasurement.asp.

* cited by examiner

*Primary Examiner* — Yu Zhao
(74) *Attorney, Agent, or Firm* — Alleman Hall LLP

(57) ABSTRACT

System and methods obtain ontology and contextual data for a plurality of domains, and generate an ontological knowledge graph using the ontology and contextual data. The ontological knowledge graph includes a plurality of nodes with links between the plurality of nodes, wherein the plurality of nodes are contained within a spherically represented data structure. The plurality of nodes with the links are displayed in a curvilinear orthography world metaphor digital view within the spherically represented data structure.

20 Claims, 17 Drawing Sheets

CROSS-DOMAIN ONTOLOGY MODEL VISUALIZATION SYSTEM WITH WORLD METAPHOR ORTHOGRAPHY

BACKGROUND

Individuals are increasingly challenged with the issues of information overload and correlation of information from heterogeneous sources. Different users have varying roles, tasks, missions, goals and agendas, knowledge and background, and personal preferences. As such, these different users typically need different pieces of the available information, ranging from real time information relating to a current task to, for example, an overall resolution strategy for a project that might be global in nature. However, it current systems are unable to quantify what purposeful information individuals need to do their job or process through their daily workflow.

Decision makers are also increasingly challenged with making sense of today's complex transdisciplinary data landscape against a managed, yet emergent, set of business questions. Compound questions are aimed at complex knowledge networks with little success of resolving due to unknown and/or unfamiliar relationships within the data landscape, as well as unidentified causality or disruptive emergent properties within the knowledge network.

Known solutions take the form of uni-disciplinary data representations with fixed windows into vertical metrics of data and data silos. However, these solutions are unable to provide transdisciplinary structural and behavioral views of causality and emergence within the entirety of an organization as networks linked data, not data silos.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

In one implementation, a system for generating a digital representation of an organization network graph includes at least one processor and at least one memory comprising computer program code. The at least one memory and the computer program code are configured to, with the at least one processor, cause the at least one processor to: obtain ontology and contextual data for a plurality of domains; generate an ontological knowledge graph using the ontology and contextual data, the ontological knowledge graph comprising a plurality of nodes with links between the plurality of nodes, the plurality of nodes contained within a spherically represented data structure; and display the plurality of nodes with the links in a digital view within the spherically represented data structure.

BRIEF DESCRIPTION OF THE DRAWINGS

The disclosed examples are described in detail below with reference to the accompanying drawing figures listed below.

Corresponding reference characters indicate corresponding parts throughout the drawings in accordance with an example.

DETAILED DESCRIPTION

Figure 1:
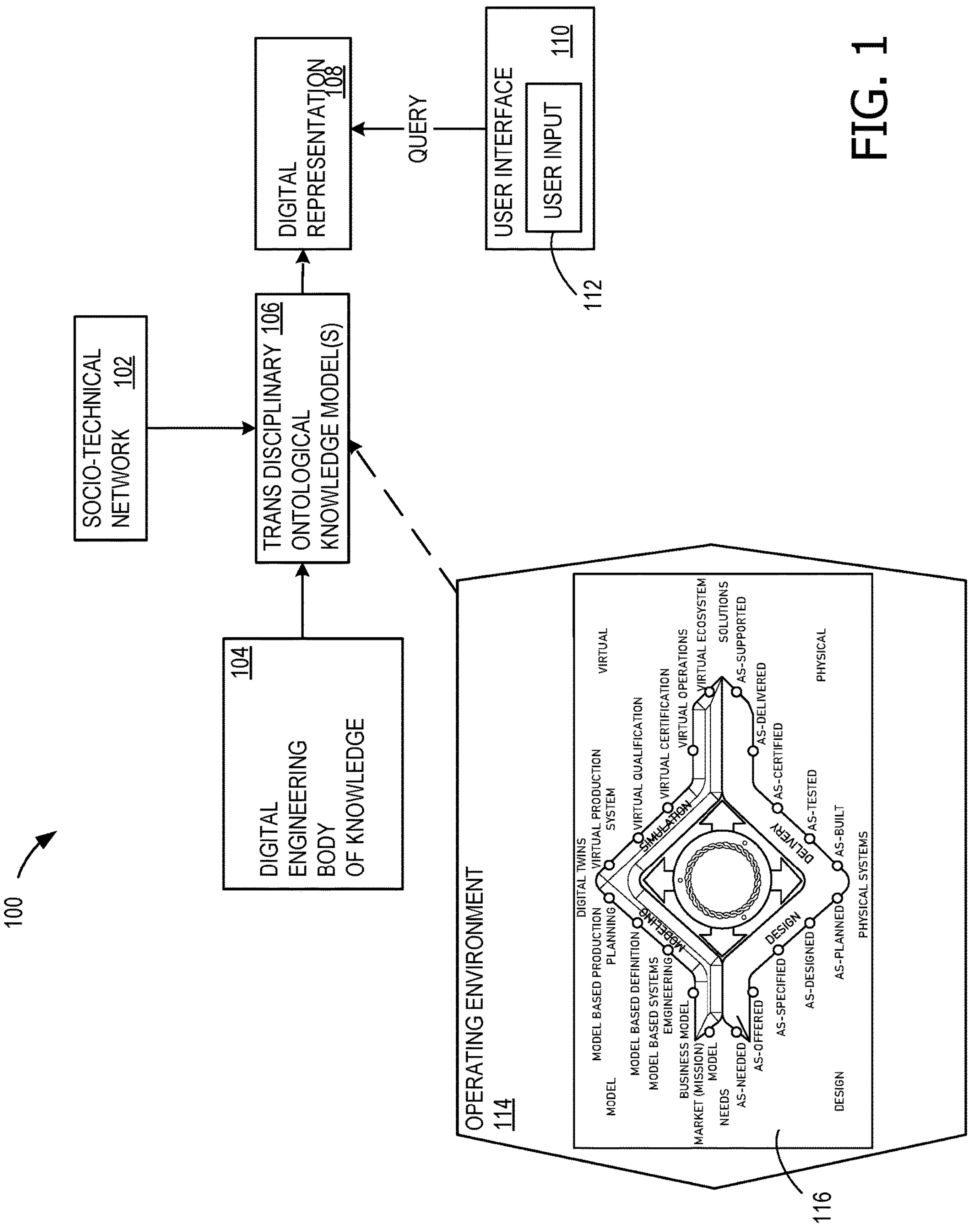
FIG. 1 illustrates a block diagram of a cross-domain ontology system according to an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects and implementations disclosed herein are directed to solutions that enable visual navigation and interrogation of data structures in multiple domains In some examples, a digital twin model of a knowledge based structure in the form of transdisciplinary socio-technical networks and/or meta-knowledge graphs for human-readable high dimensional visual representations. (e.g., 150,000+ node-network with each node reflecting a person in an organization) allows for more efficient and intuitive interrogation of the data structures. For example, the visual navigation and interrogation of this network, including a meta-knowledge graph model allows users (e.g., decision makers) improved interfacing with the data structures. Users are able to quickly see and experience the structure and behavior of the organization with data structures and their connections with lenses into graph model influences and also identify business performance causality and emergence by following a sequence of related indicators or "digital threads". As a result, "digital knowledge threads" can be processed while concurrently evaluating impacts and resolving across the an eco-system of an organization to determine different properties (e.g., operational excellence, safety, quality, schedule, cost and customer) to make timely and accurate determinations against one or more problem sets. In one example, the digital twin model, being a socio-technical network meta-knowledge graph in Model-Based Systems Engineering (MBSE), allows for classifying and governing a system by application to a human-centric system.

As used herein, in some examples, a knowledge graph refers to a graph that characterizes a digital representation and visual language, based on worldbuilding logic, for objects and interrelations organized in an ontological graph from which new emergent and causal knowledge may be derived and extracted. A knowledge graph structure in some examples corresponds to nodes (objects in a domain) in combination with links (connections between nodes based on node property associations) assembled into a visual ontological representation of a domain. The knowledge graph digital representation is the visual artifact revealing the structure of the organization as a system world-model.

The present disclosure provides multi-disciplinary data representations with dynamic windows, wherein a cross-domain ontology model crosses discipline boundaries and provides, for example, transdisciplinary structural and behavioral views of causality and emergence within the entirety of an organization's structure. For example, trans-disciplinary centrality and modularity of intellectual capital are provided with interactive digital views as a "world metaphor".

Aspects of the disclosure have a technical effect of improved operation of a computer, for example by improving the efficiency of computational hardware, and provide better allocation of resources, as compared to traditional systems that rely on, for example uni-disciplinary data representations. Aspects of the disclosure are able to advantageously ontologically represent an organizational structure with causal and emergent properties within the digital twin model, which can be visually interrogated with horizontal, vertical and transverse movement in 4D space (i.e., X, Y, Z, time).

Figure 4:
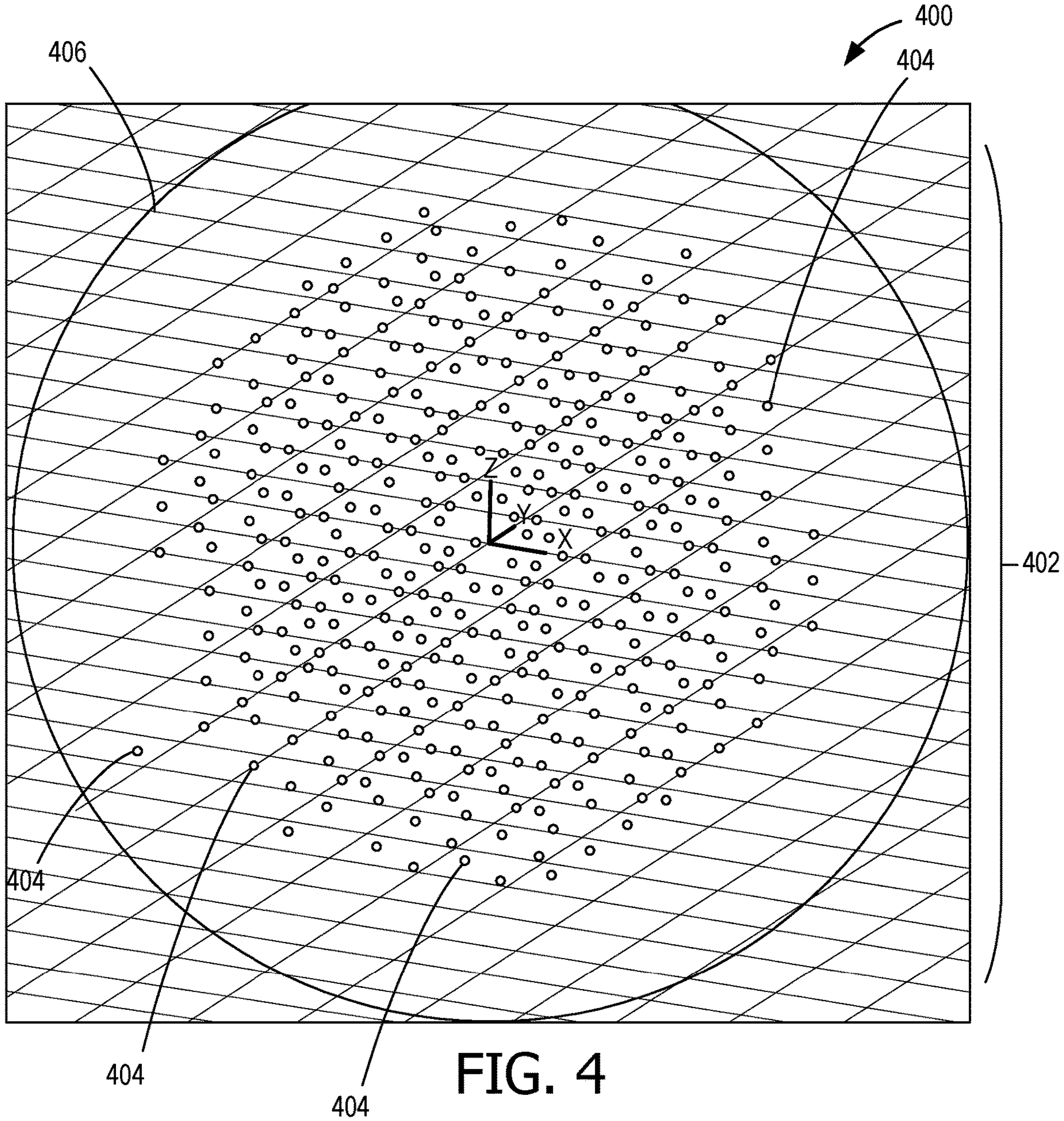
FIG. 4 illustrates a digital view of a three-dimensional (3D) data structure corresponding to a data layer according to an example.

Referring more particularly to the drawings, FIG. 1 illustrates an improved digital view of ontology-based data as a block diagram of a cross domain, trans-disciplinary, ontological knowledge system 100. For example, the system 100 provides improved ontology-based data integration using multiple cross-domain ontologies to effectively combine data or information from multiple heterogeneous sources in different domains and allows for a "world view" display (as shown in FIG. 4) of the data or information.

The system 100 is configured with a socio-technical network 102 and a digital engineering body of knowledge (BoK) 104 to create a digital representation 108 (e.g., a digital representation of a large organization) using trans disciplinary ontological knowledge model(s) 106. The digital representation 108 is then queried to, for example, provide insights regarding causal elements associated with the query provided. For example, a user interface 110 receives user input 112 (e.g., a query, interrogation, navigation etc.) that is performed on the digital representation 108. In the illustrated example, MBSE for an organization is deployed within an operating environment 114 that includes a digital twin model 116 as the trans disciplinary ontological knowledge model(s) 106 and hosted on a computing device 100, which is described in more detail in relation to FIG. 17. The digital engineering BoK 104 includes, but is not limited to, data regarding people, knowledge, social networks (organizations), systems, programs, workflows/business processes, tools, business metrics, customers, geography and time, among others. In one example, the digital engineering BoK 104 is combined with logical algorithms to create the trans disciplinary ontological knowledge model(s) 106 (e.g., logical algorithms for querying the trans disciplinary ontological knowledge model(s) 106) for various aspects of the organization. As such, this information can then be queried using the user interface 110 to, for example, gain insight on a specific query, such as a specific business question (e.g., "what factors are most likely to result in a rotorcraft program win?" results in an indication of personnel, geography, and tools used).

Thus, the system 100 provides a data structure containing a combination of personal/professional data (e.g., education, years of service, etc.), explicit social networks (e.g., connections in professional social platforms), tacit social networks (e.g., people emailed, number of times emailed, recipients' programs, etc.), programs, success of programs, etc., wherein ontological models are created based on the data structure and user provided queries. The displayed information is provided via the user interface 110 (e.g., a graphical user interface) within a "world view" (See FIG. 4) that provides an intuitive interface to the data structure, such as complex data structures that extend across multiple domains (e.g., human resources (HR), information technology (IT), engineering, etc.). In one example, the trans disciplinary ontological knowledge model(s) 106 allow for visualization of data structures using a created set of logic taxonomies to interconnect the different domains, such as a created set of logic taxonomies wherein there is an ontological connection between HR data structures and IT data structures, an ontological connection between IT data structures and engineering data structures, etc.

It should be noted that the visualization can be represented in different ways, which in one example, includes a "world view" of the ontologically connected data structures. For example, the organizational digital twin (digital twin model 116) is represented graphically, wherein the various types of knowledge, networks, tools, etc., are represented by a series of rings and the concentration of queried elements as spikes on a map as described in more detail herein.

Figure 2:
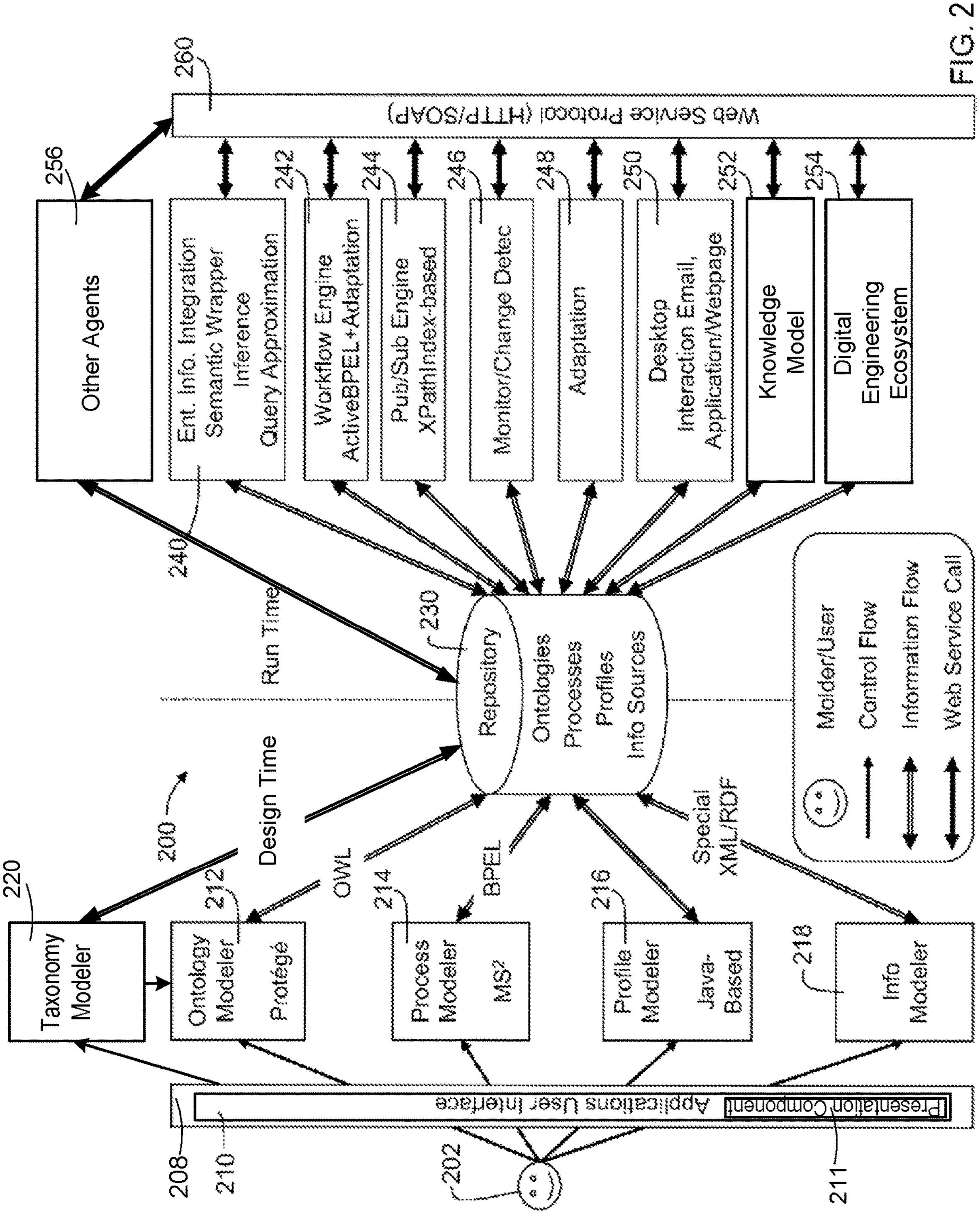
FIG. 2 illustrates a block diagram of a cross-domain ontology system according to another example.

Thus, some examples of an infrastructure provide each information consumer and producer with a customized, cross-domain, knowledge system that provides access to relevant information, integrated from multiple sources across multiple domains, in the context of intellectual capital, while contributing to the building and sharing of collective information space and knowledge. As shown in FIG. 2, the infrastructure is an information architecture 200 as illustrated for a multi-domain query formulation and information retrieval and aggregation system. Through a digital view/presentation component 211 provided by an applications user interface 210 presented by a display 208, one or more users 202 are able to generate models, during a design time, that are utilized in information navigation and retrieval. Specifically, an ontology modeler 212, a process modeler 214, a profile modeler 216, an information modeler 218, and a taxonomy modeler 220 are shown, all of which provide connected data to a data repository 230, which in various examples is data from multiple different domains (e.g., cross-domain ontology data). As a result, the data repository 230 includes ontologies, processes, profiles, and information sources across a number of information domain spaces. That is, one or more examples provide the trans disciplinary ontological knowledge model(s) 106 using the data repository 230 that is defined with one or more taxonomies. One such taxonomy allows for interrogating and navigating data in a "world view" (as shown in FIG. 4) having a plurality of knowledge containers or shells representing individuals having tacit knowledge and defining different nodes within the "world view". That is, the knowledge containers or shells define bounding constraints wherein attributes of the knowledge container are loaded with data from the data repository 230 in one example.

The present disclosure allows for leveraging the tacit knowledge across, for example, a large organization wherein work is performed on multiple programs and efforts distributed throughout the world. The individuals at these organizations leverage a combination of knowledge, social networks and tools to advance the organization's goals, which can be interrogated and viewed with the present disclosure, including identifying tacit knowledge that directly impacts the quantity and quality of the data used by an organization to make decisions. Thus, various examples allow for identification of tacit knowledge through a cross-domain ontology model approach (and presented in a digital view), thereby improving over explicit/static knowledge identification through typical social network analysis (e.g., LinkedIn).

In operation, at run time, the data repository 230 provides modeling information and receives query results from a number of source applications. Some of these source applications include, for example, an information integration application 240, a workflow engine 242, a Pub/Sub engine (define) 244, a monitor/change detection engine 246, an adaptation engine 248, desktop interaction 250, knowledge model 252, Digital Engineering Ecosystem 254, and any other agents 256, all of which are implemented in one example as web services utilizing one or more of an HTTP or SOAP protocol 260.

Figure 3:
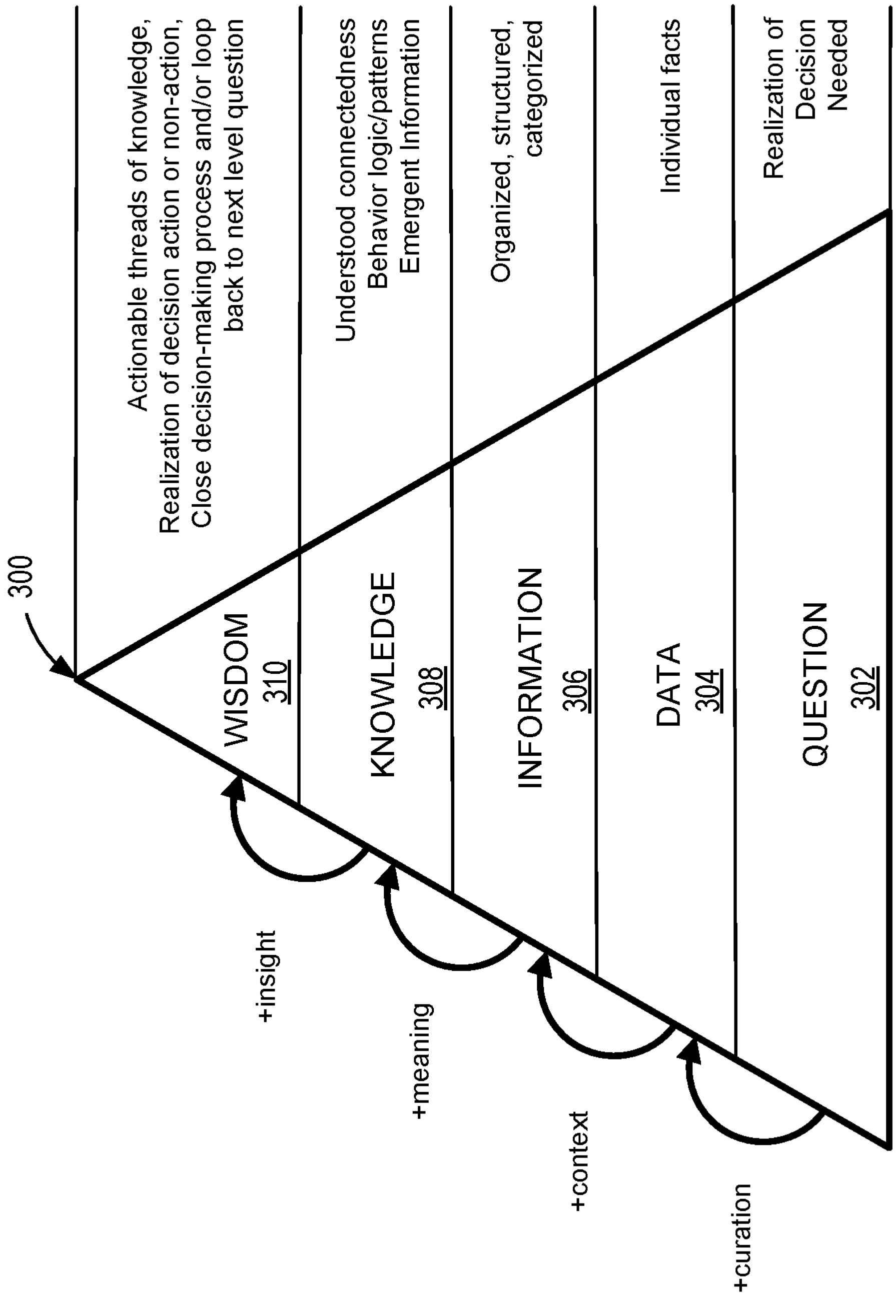
FIG. 3 illustrates a pyramid of maturing stages of an ontological structure of data-to-information-to-knowledge-wisdom according to another example.

With reference now to FIG. 3, a pyramid 300 of maturing stages of an ontological structure of data-to-information-to-knowledge-wisdom is provided, which illustrates the different layers for a data structure presented to a user in, for example, a digital view. As shown in FIG. 3, the pyramid 300 includes five different layers, question layer 302, data layer 304, information layer 306, knowledge layer 308, and wisdom layer 310. While five different layers are provided herein, fewer or more stages/layers are also possible. Starting with the question layer, each layer builds on the previous layer such that the wisdom layer 310 is a result of all previous layers 302-308. That is, FIG. 3 represents a high level overview of what each of the different layers/stages of the digital view of the data structure represent to a user as the user traverses/interacts with the digital view.

For example, upon receiving a user input/question (which corresponds to the question layer 302) at user interface 110, the information architecture 200 in FIG. 2 is configured to allow generation of a digital view of the tacit knowledge of individuals, wherein the ontologically connected data is represented in a "world view" as shown in FIG. 4, and this "world view" corresponds to the data layer 304.

For example, as illustrated in FIG. 4, a digital view 400 of a three dimensional knowledge sphere corresponding to a data layer. FIG. 4 further illustrates the tacit knowledge of individuals within an organization structure defined within a "world view" 402. That is, the digital view 400 is configured in a spherically represented data structure BoK that can be viewed and interrogated in 3D space and with time properties. The digital view 400 includes a plurality of nodes 404 (e.g., the data) that each represent a person within the organization, and each person includes individual facts. As such, the digital view 400 defines a human capital neural network in some examples that is generated using the trans disciplinary ontological knowledge model(s) 106.

In various examples, the nodes 404 are primary nodes on the base layer of a knowledge graph that are considered "base-nodes". In one example, each node 404 is a container for knowledge. That is, each node 404 is a knowledge container or shell for the individual, wherein the knowledge container includes tacit and explicit knowledge of the individual. In various examples, each node 404 manufactures and/or publishes knowledge. That is, each node 404 in some examples is a container or shell that is a proxy for an agent (e.g., an artifact of knowledge that has been meta-structured). The nodes 404 thereby define agents as sources of insights, such as of tacit knowledge of individuals, that is displayed in a "human" view. Thus, in some examples, each node 404 has attributes in critical knowledge and skills, systems, programs, tools, and social networks. In the examples provided herein, each base node has a defining geometric shape in the digital twin digital representation. Non base-nodes default to a spherical defining geometry shape in the digital twin digital representation.

Figure 5:
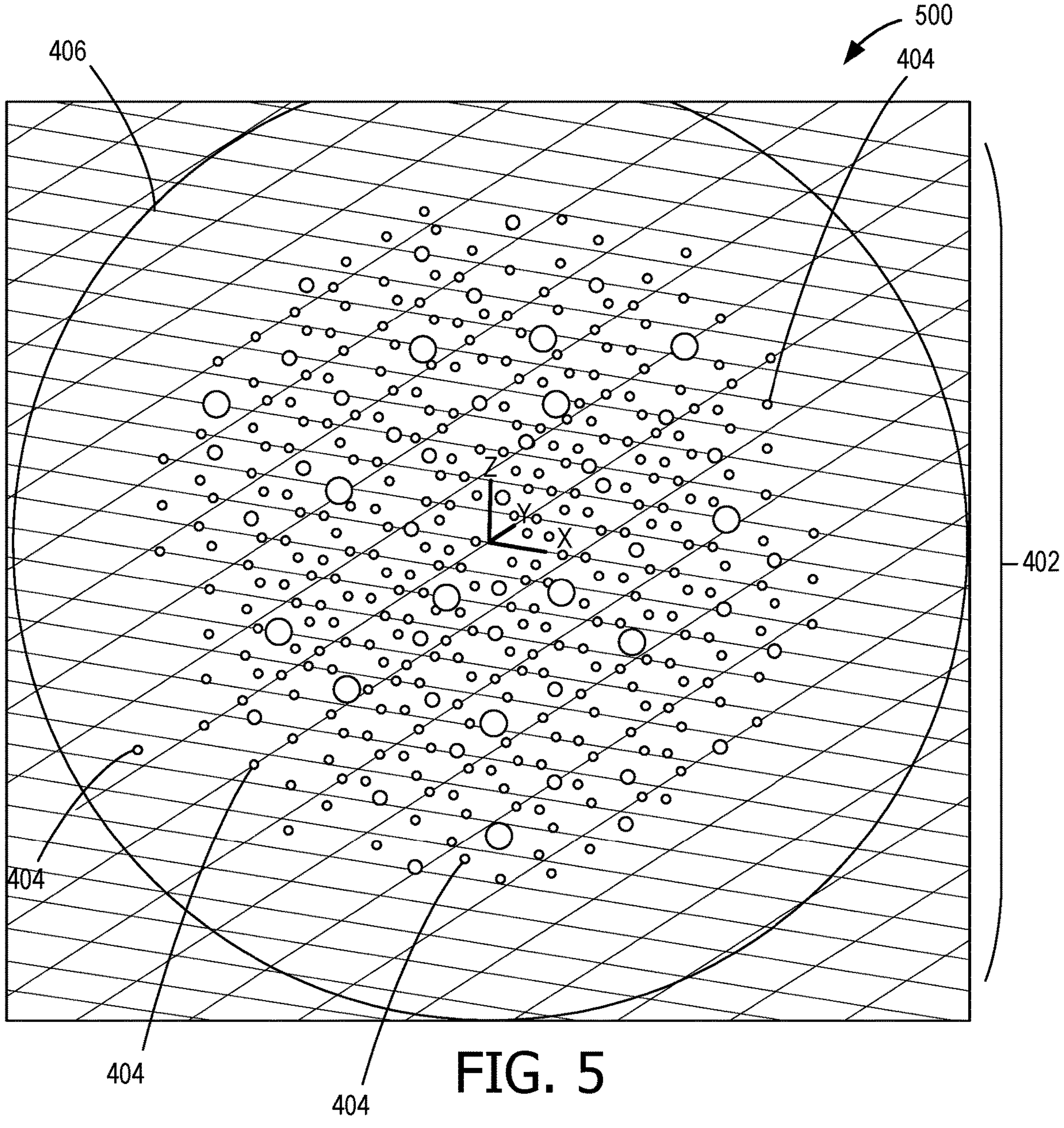
FIG. 5 illustrates a digital view of a 3D knowledge sphere corresponding to an information layer according to an example.

The digital view 400 is configured to allow navigation and interrogation of the data represented by the nodes 404. In some examples, one or more properties of the nodes 404 facilitate the navigation and interrogation operations. In one example, one or more nodes 404 have connection to one or more other nodes 404. The connections are associations to people, systems, programs, tools, processes, knowledge artifacts, critical knowledge points, etc. The associations in various examples are defined by ontological relationships, such as defined by the trans disciplinary ontological knowledge model(s) 106. Thus, in some implementations, the color, size, location, orientation, etc. of the nodes 404 or objects associated with the nodes 404 represents one or more properties of the nodes 404. For example, as the user navigates/interrogates the data represented by the nodes 404, and with reference now to FIG. 5, nodes within the digital view begin to visually organize/categorize (e.g., taxonomy/ontology) by centrality and/or modularity given a taxonomy or ontology structure. As shown in FIG. 5, which corresponds to the information layer 306, context for the nodes 404 begin to take shape as the nodes 404 are represented as varying in size, and more specifically, as three different sizes in FIG. 4; however, any number of varying sizes are contemplated herein with each size corresponding to particular set of information properties. However, a size of the nodes 404 In one implementation, a size of the node 404 represents a centrality property of the node 404 (e.g., a centrality ranking within a network of nodes 404) and a color of the node 404 (not shown) represents a modularity of the node 404 (e.g., a modality ranking within a network of nodes 404). However, as should be appreciated, many different graph data science or analytic properties can be represented in many different ways, as also described in more detail herein.

As can be seen, in FIGS. 4 and 5, the nodes 404 are arranged within the spherical representation, which is based in part, on the cross-domain ontological connections defined by the trans disciplinary ontological knowledge model(s) 106. In one example, the volume of the knowledge sphere 406 corresponds to a horizontal embodiment of knowledge (representing horizontal metrics of data instead of vertical metrics of data), thereby allowing transdisciplinary structural and behavioral views, such as of causality and emergence within the entirety of an organization. This world view 402 provides transdisciplinary centrality and modularity of intellectual capital with interactive digital views as a world metaphor providing more intuit and more easily navigable and interrogatable data than 2D temporal data dashboards.

The world view 402 is configured having a wireframe of geometric design in some examples. The elements within the knowledge sphere 406 represent people and communities, wherein the nodes 404 are arranged by modularity in some examples (e.g., at the information layer 306). In one example, clusters of the nodes 404 present different representations. For example, clusters of nodes 404 form an outline definition of experiential User Interface (XUI) "world view". In the world view 402, using the user interface 110, a user can zoom and/or maneuver within the world view 402 to navigate and/or interrogate the data within the knowledge sphere 406, such as to identify different nodes 404. It should be noted that as zooming and maneuvering is performed, the types or granularity of the nodes 404 can change. For example, an initial zoom operation results in the nodes 404 being knowledge nodes. A further zoom operation results in the nodes 404 being program knowledge nodes. It should be noted that spherical geometry is provided at viewing scales greater than a defined value and human geometry is provided at viewing angles less than the defined value.

In one example, the digital view 400 represents an organization as a system digital twin, such as a socio-technical network of the organization defined by model logic. In this example, the knowledge sphere 406 defines a knowledge container that encapsulates the socio-technical network. It should be appreciated that knowledge represented within the knowledge sphere 406 is internal knowledge (knowledge within the organization). That is, the knowledge sphere 406 is a container that represents an embodiment of internal knowledge. The knowledge sphere 406 in one example is further configured as a container that separates internal knowledge from external knowledge. That is, any representations (e.g., nodes 404) outside of the knowledge sphere 406 represent external knowledge (knowledge outside the organization). Thus, multiple knowledge lenses can be defined to be organization internal or organization external.

Thus, in some examples, the knowledge sphere 406 is a spherical knowledge container of internal knowledge, wherein the spherical knowledge container is the bounding area and geometric surface of the organization as a system world-model. As described in more detail herein, the spherical knowledge container boundary separates internal knowledge from external knowledge, wherein high ranking centrality nodes may gravitate to the spherical knowledge container surface.

Figure 6:
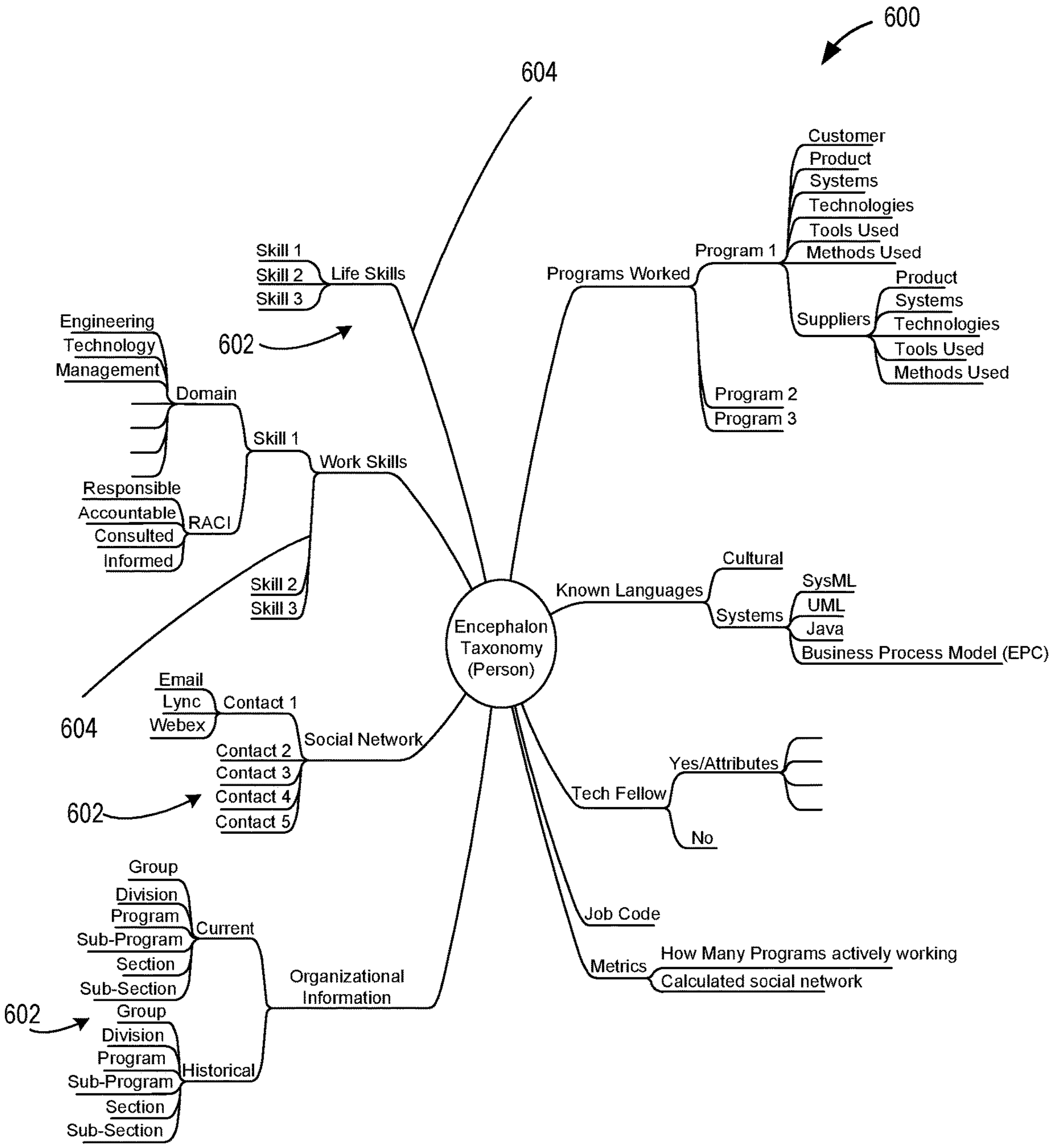
FIG. 6 is a taxonomy graph of a genome mapping according to an example.

In one example, each node 404, which can be a base-node is configured to have an internal view of the properties of the node 404 in the form of a circular graph network. One example of the circular graph network is a taxonomy/genome mapping 400 as illustrated in FIG. 6. The genome mapping 600 defines different sets of properties 602, for example, the type of domain or information domain, the connection type, etc. Interconnections 604 between the different sets of properties 602 define the corresponding associations therebetween. That is, the BoK is represented by domain taxonomies, and domain taxonomies plus connections between taxonomy elements reflect an ontological model.

The properties and interconnection of the nodes 404, either individually or in combination, are represented within the knowledge sphere 406, such as illustrated in FIG. 6 taxonomy model. As can be seen, nodes 404 have connections 604 to other nodes 404, which is also shown within the knowledge sphere 406 in FIG. 7, corresponding to the information layer 306. It should be appreciated that a single node 404 can have connections to multiple other nodes 404 and the connections between nodes 404 can include connection to an intermediary node. Using the associations and ontological information, such as the trans disciplinary ontological knowledge model(s) 106, node information is visually represented to facilitate navigation and interrogation of the data represented by the nodes 404 in some examples.

Figure 8:
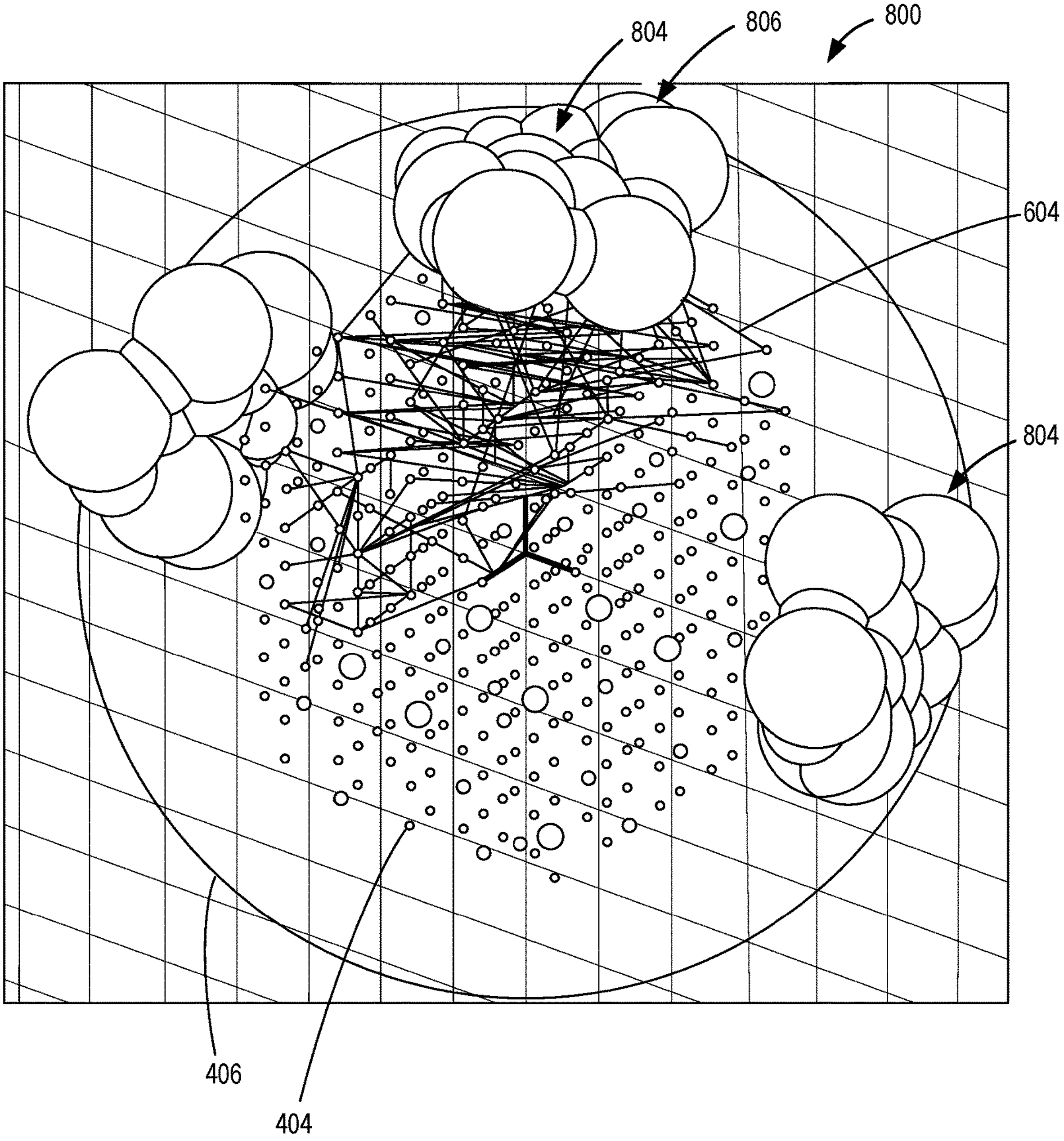
FIG. 8 illustrates a digital view of a 3D data structure showing a terrain topology corresponding to the knowledge layer according to an example.

With reference now to FIG. 8, which corresponds to a transition from the information layer 306 to the knowledge layer 308, a terrain of the topology knowledge sphere 406 defines different properties of the data, including the size, location, color, etc. of the nodes 404. For example, high centrality organization nodes (e.g., the nodes 804) are represented by larger spheres that "float" to the surface of the knowledge sphere 406 to create terrain topology. That is, the nodes 804 have a changed size and location based on ontological data defined by the trans disciplinary ontological knowledge model(s) 106. These visible larger spherical elements allow for easier identification of the high centrality organization nodes 804. It should be noted that "centrality" generally corresponds to the number of connections 602 incident upon the nodes 804. That is, the more connections to or between nodes 404, the larger the spherical elements for a node (e.g., the nodes 804) or set of nodes. In some examples, "centrality" includes a number of connection paths through the nodes 404 and 804. Thus, in various examples the terrain of the knowledge sphere 406 is an expression of forces between the nodes 404 and 804, such as business forces.

Thus, high ranking centrality nodes, such as the nodes 804, having transactions from outside (external) the knowledge container undergo modularity influence from these transactions and, in some examples, break the surface of the container to form terrain topology on the knowledge container surface. In some examples, the terrain topology aligns to the world business model concept and archetype, wherein the world model archetype reflects the business and/or intellectual capital eco-system. It should be noted that the terrain topology is an expression of external (business) forces and the amount of node volume penetrating the knowledge container is associated with the volume of external transactions.

Figure 9:
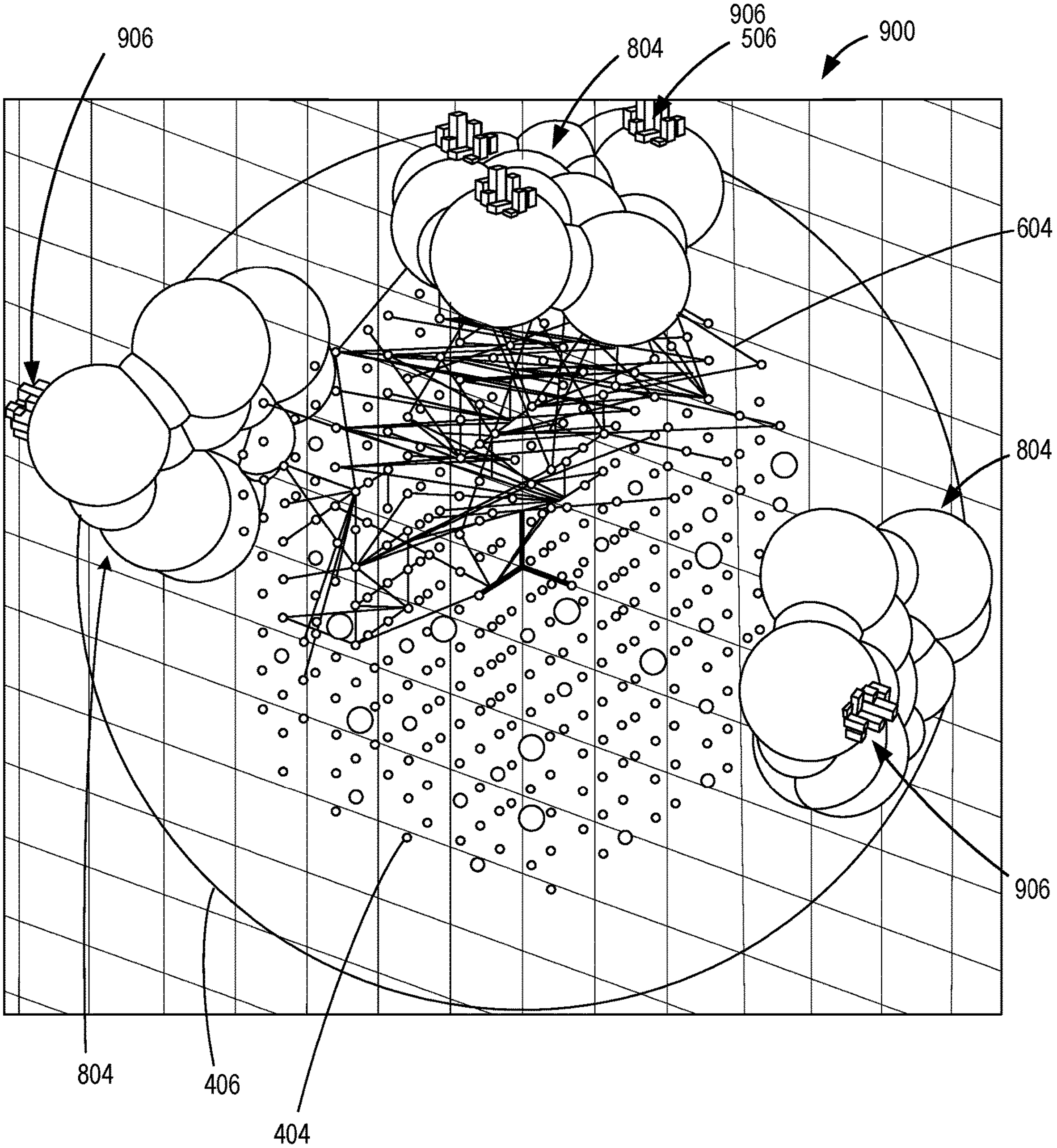
FIG. 9 illustrates a digital view of a 3D data structure showing a terrain topology geometry and metrics corresponding to the knowledge layer according to an example.

With reference now to FIG. 9, which corresponds to the knowledge layer 308, the knowledge sphere 406 includes an atlas configuration that represents a "map" between the nodes 404. That is, a map-like configuration is displayed by a digital view 900 having elements corresponding to typical map or terrain features (e.g., cities, mountains, etc.). In the example of an organization having a plurality of businesses, each business is strategically geolocated on a market atlas and labeled accordingly. In this example, the terrain topology is a transaction with ties or links to the market atlas. As further illustrated in FIG. 9, the terrain topology in some examples includes other elements, such as city objects 906, which are shown located on the high centrality organization nodes 804. That is, city objects 906 populate the terrain topology in some examples. The city geometry in one example is an expression of the daily business outputs and metric (health and status), such as corresponding to the business. That is, the city objects 906 on the terrain in one example express business transactions and customer engagement (e.g., reflect the status of transactions and/or business metrics). In one example, the city objects 906 are rooted in activities and dynamics of the supporting neural network. Thus, the city objects 906 in some examples represent determined business centers of gravity (terrain)

Figure 10:
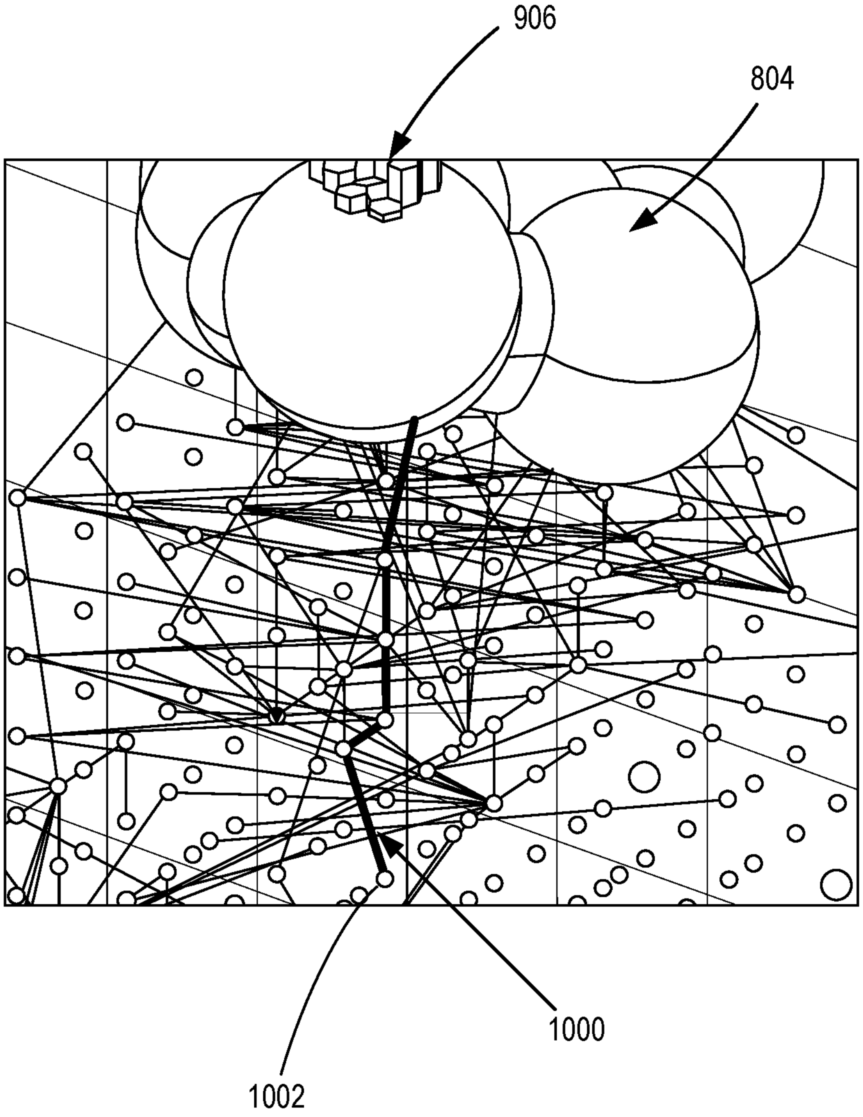
FIG. 10 illustrates a digital view of a 3D data structure showing an optimized path connection corresponding to a wisdom layer according to an example.

Additionally, in one example, as illustrated in FIG. 10, which corresponds to the wisdom layer 310, city object 906 has a critical path 1000 within the nodal network that feeds the city object 906 (e.g., a differently colored path between nodes 404). The critical path 1000 highlights node threads with associated aggregate knowledge. In some examples, critical paths are established for optimization, and this optimization enables the user to make a decision. Thus, the critical path 1000 provides the user with a visual representation of an answer for the user based on the specific queries/interrogations through the layers 302-308, with the direct path (e.g., the critical path 1000) being between a particular node 1002 and the node comprising the city object 906. For example, if the original question was which person/node 404 has a particular set of skills for a particular program that is to be implemented in a particular business unit, the critical path 1000 identifies the node 1002 representing that person with the particular set of skill for the program/business unit represented by the node 906.

Thus city objects 906 in geometry form populate the surface of any one node reflecting an expression of metrics, business performance indicators, and/or question status in some examples. The city objects 906 on domain nodes and/or terrain topology nodes express business transactions and externals engagement metrics in some examples, and the city objects 906 are transactional to the internal knowledge container or external knowledge objects and influences. The city objects 906 are, thus, rooted inside the knowledge container through the supporting socio-technical network. Every city object 906 has a critical path within the socio-technical network that sustains the structure and behavior thereof. City object critical paths highlight nodes and links that represent causality within the intellectual capital socio-technical network as described in more detail herein. It should be noted that the overall dynamics of node behavior and the city object critical paths identify emergence within the socio-technical network in some examples. This emergence can be represented by new nodes (new knowledge or domain properties being generated by the interaction of base-nodes and/or base-node domain properties.)

It should be appreciated that the various elements and objects can express different properties or features. Moreover, the various elements and objects can be sized, shaped, configured, etc. differently, such as to better visually present the expression to which the element or object corresponds.

Figure 11:
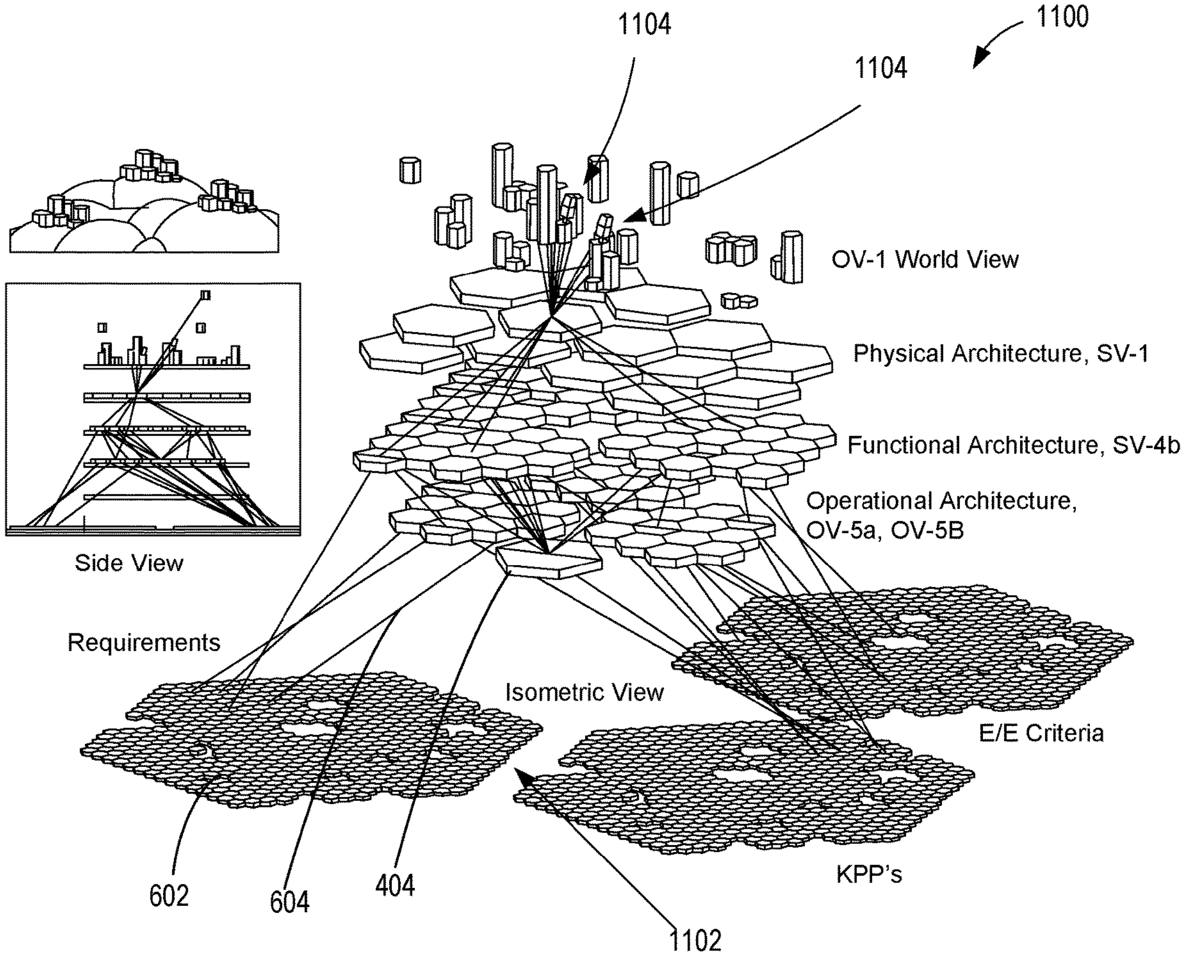
FIG. 11 illustrates a digital view of a 3D cross domain ontology structure according to an example.

With reference now to FIG. 11, the present disclosure contemplates different configurations of the digital view 300. For example, a spherical translation can be performed on the digital views 400, 500, and 700-900 such that the sphere representing the knowledge sphere 406 is translated to a 3D planar view 1100 for a "one look" view as illustrated in FIG. 11 with multi-view windows being presented at once (e.g., isometric view, side view, zoom view, etc.). In this configuration, architectural layers 1102 are separately represented, wherein the nodes 404 are planar. In the 3D planar view 1100, different elements are provided in some examples to facilitate viewing. For example, elements 1104 (illustrated as push pins) are provided that represent conclusions with threads.

It should be appreciated that the translation maintains data depth in the isometric perspective. It should also be appreciated that other types of translations can be performed. For example, the data models can be translated into geometry models.

Figure 12:
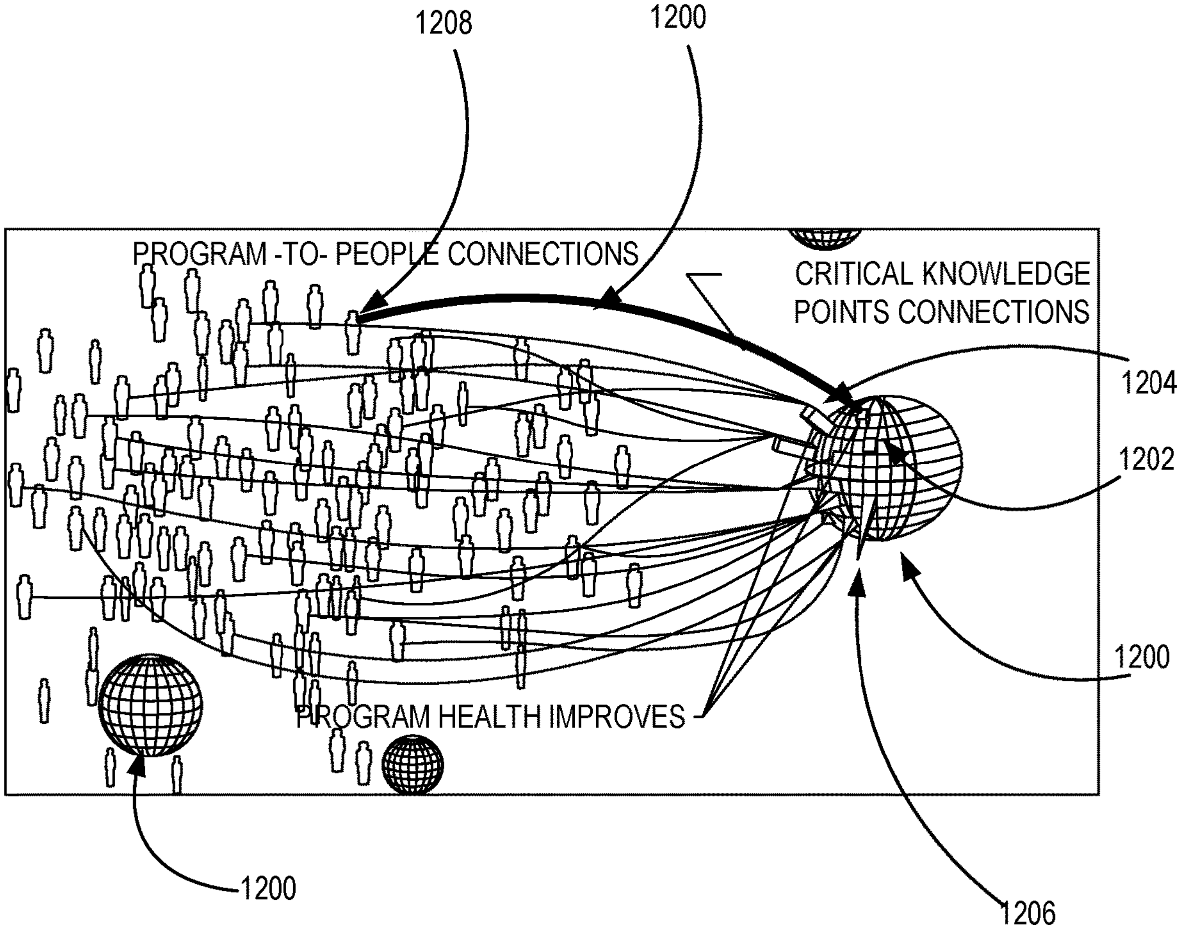
FIG. 12 illustrates an overall sub-graph representation of an ontological structure having analytics applied for a given inquiry according to an example.

Variations and modifications are contemplated. For example, the knowledge network in some examples is mapped pivoting on people, such as domains for people and people taxonomies. As another example, an analysis is performed on the knowledge network for centrality and modularity Thus, various examples provide a cross-domain ontological digital view that facilitates maneuvering and interrogating trans-disciplinary and/or cross-domain data. For example, FIG. 12 illustrates an overall sub-graph representation of an ontological structure having analytics applied for a given inquiry. More specifically, as shown in FIG. 12, in a program-to-people connection implementation, program nodes 1200 are represented having different identifiers or elements, which can include the different elements and objects as described herein. In this example, different indicators 1202, 1204, and 1206 are illustrated, having different shapes and sizes (and can be differently colored). In one example, the indicators 1202 represent node properties. That is, the indicators 1202 are geometric indicators of the one or more properties of the program node 1200, such as tacit knowledge associated with the program node 1200. The indicators 1204 are unique knowledge indicators in one example. That is, the indicators 804 identify unique knowledge information for the program node 1200 (not present in other program nodes 1200). The indicators 1206 are distinct skills indicators in one example. That is, the indicators 1206 indicate a set of skills for the program node 1200. The indicators 1202, 1204, and 1206 are configured in some examples to indicate potential gaps and/or strengths in knowledge (e.g., yellow colored or differently shaped objects indicating that program health has gaps). The indicators 1202, 1204, and 1206 change appearance in some examples, such as based on changing conditions. For example, the color of the indicators 1202, 1204, and 1206 changes when program health improves or exceeds a defined threshold with respect to the property associated with the indicators 1202, 1204, and 1206. When all indicators 1202, 1204, and 1206 are a "healthy" color (e.g. green), this indicates a high functioning program in some examples (e.g., program health is high performing). Thus, using this configuration, for example, expanded bench strength searches can be performed within the business units.

Additionally, as can be seen, a critical path 1200 is also indicated. In this example, the critical path 1200 identifies critical knowledge point connections between node 1208 and the program node 1200.

Figure 13:
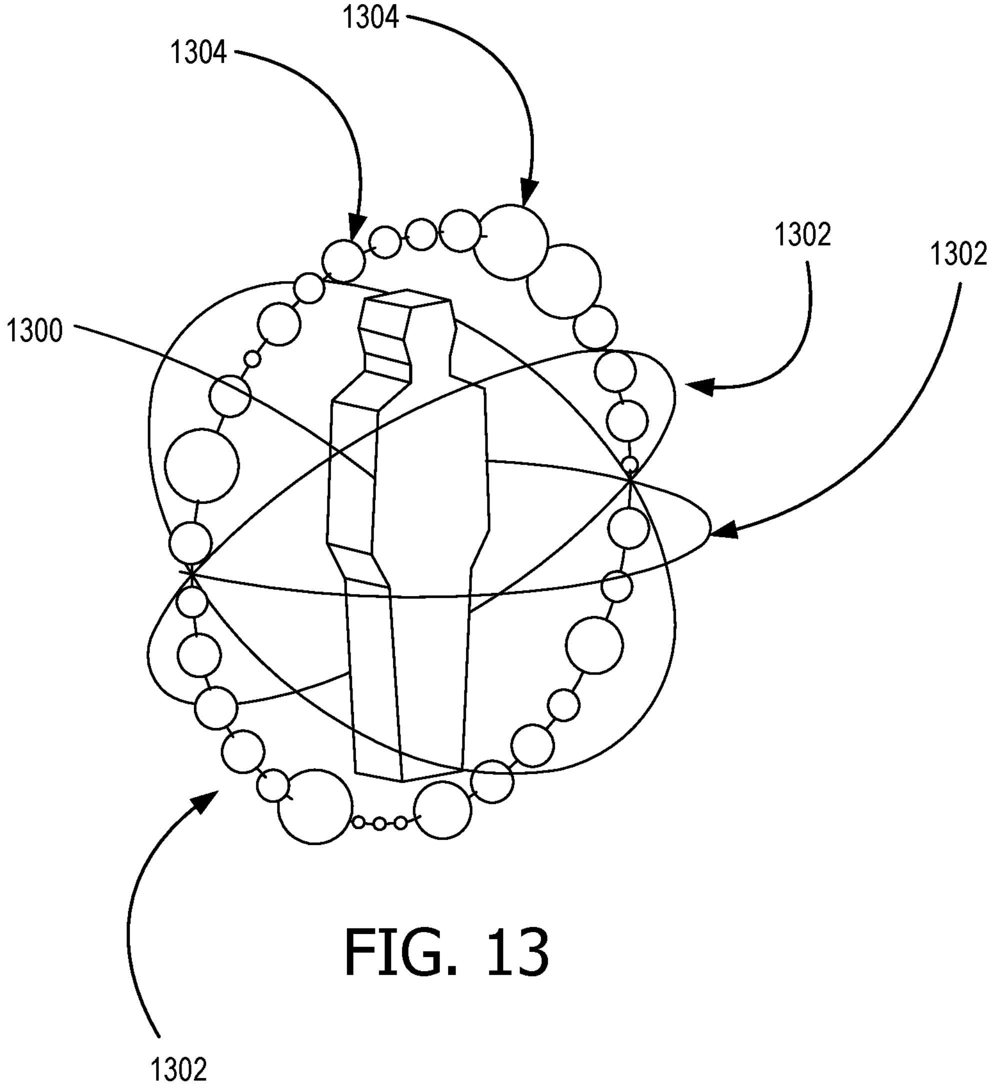
FIG. 13 illustrates a representation of trans-disciplinary knowledge properties according to an example.

It should be noted that the base of knowledge is defined by the knowledge containers or shells corresponding to individuals within the program node 1200. For example, with respect to a person knowledge node, each node has distinctive skill indicators and unique knowledge indicators. In some examples, zooming in results in display of the node 1208 as personal digital twin avatar 1300 of the individual with individual specific indicators (e.g., showing circumnavigational critical knowledge points), as shown in FIG. 13. For example, rings 1302 are displayed around the individual digital twin avatar 1300 and represent domains of taxonomy of a person (e.g., represented by the individual digital twin avatar 1300). In some example, the rings 1302 may be one of a knowledge ring (e.g., a critical knowledge ring), a skills ring, a system ring, a program and tools ring, a social, ring, etc. These rings 1302 are color coded and include spheres 1304 that indicate properties relating to the individual. In some examples, the color of the personal digital twin avatar 1300 indicates whether the node corresponding to the personal digital twin avatar 1300 is activated or at rest (not activated). In one example, the spheres 1304 are indicators that correspond to a particular one of the rings 1302 in which the spheres 1304 are on. For example, on a skills ring, a sphere represents a particular skill the individual has, such as, speaking a particular language, organization, carpenter, magician, long distance runner etc. Further, on a knowledge ring, a sphere represents what the individual knows. An example of knowledge is a publication, a degree, or a certification. In some examples, a size of the sphere is a value corresponding to the particular indication the sphere represents. Thus, the larger the sphere, the greater the skill level is for the particular skill. Further, while spheres are provided in FIG. 13 on the rings 1302, any shape (two-dimensional or three-dimensional) can be used herein.

With the above discussed implementation, improved operational performance is enabled through accelerated access and understanding to transdisciplinary data relationships and knowledge that represent the organization structure and behavior. The visual navigation and interrogation of the digital twin model 116 for the organization system allows for decision makers to see and experience the intellectual capital flow within the business eco-system of the organization with the opportunity to identify, for example, causality and emergence by following “digital threads” and “performance indicators” within the model (e.g., navigation and interrogation using the digital views 400, 500, and 700-900). This capability allows, for example, the decision maker to process compound questions into “digital knowledge threads” across the many properties of operational performance, such as; safety, quality, schedule, cost and customer, to make determinations on understanding and resolve conflating the problem set decisions into predictive and prescriptive actions, among others.

In some example, the organization system digital twin meta-knowledge representation, via an eXperiential User Interface, is used as a human engagement portal for rendering digital views, both static and interactive, of relational knowledge associated with compound questions and business performance indicators providing shared understanding and knowledge transfer of organization properties with structure, behavior, causality and emergence. The digital twin model 116 is used in some examples as a meta-knowledge graph with the digital views enabling real-time human visual synthesis and analysis of complex data and the data structure enabling machine learning logic enhancement.

Various examples provide visual navigation and interrogation of knowledge data, including tacit knowledge. Classifying a business as a system, and pivoting on intellectual capital, allows the present disclosure to conflate system science and systems engineering principles to the construction of the digital twin model 116 of the organization's structure and behavior in the form of transdisciplinary socio-technical networks and/or meta-knowledge graphs for human-readable high dimensional visual representations.

Thus, one or more examples are configured as follows:

Translate organizational structure and behavior data into the digital twin model 116 bearing the form of a node-link meta-knowledge graph digital representation;

Ontologically represent the organization system with causal and emergent properties within the digital twin model 116;

Maintain data prominence within the digital twin model 116 on structure and behavior of people and intellectual capital;

Create human-readable high definition representations of the organization system digital twin model 116 as a world metaphor.

Generate digital viewpoint(s), static and interactive, of the business system;

Allow seamless navigation through the model of the organization system traversing numerous and diverse levels of abstraction in scale and definition;

Visually interrogate organization system model with horizontal, vertical and transverse movement in 4D space (X, Y, Z, time);

Visually represent centrality and modularity within the digital twin meta-knowledge properties to include but not limited to: people, knowledge, social networks (organizations), systems, programs, workflows/business processes, tools, business metrics, customers, geography, and time;

Transform knowledge graph digital viewpoint properties given a select role or lens;

Provide digital viewpoints of operational excellence workflows and properties; and Perform knowledge graph analysis.

The present disclosure enables a systems engineering/system science (systemology) approach to capture, model, and evaluate human-centric ecosystems that centers on people and intellectual capital data prominence (knowledge management). A world metaphor is also enabled for human-readable digital representation to interactively navigate and interrogate the model (world-building), wherein transdisciplinary operational excellence digital viewpoints are supported. In some examples, the organization system is provided using a system digital twin ontological visual language (meta-knowledge digital representation) allowing the world metaphor to be used to navigate complex data structures.

Figure 14:
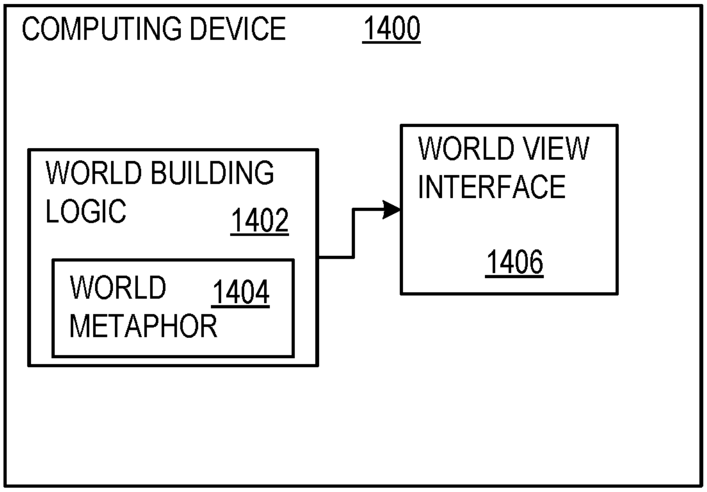
FIG. 14 is a block diagram of computing device implementing world building logic according to an example.

An organization intellectual capital digital twin, and various aspects of the disclosure, can be implemented using a computing device 1400 as illustrated in FIG. 14. The computing device 1400 is operable in some examples to generate a socio-technical ontological meta knowledge graph (data structure) in combination with world metaphor business archetype digital views (digital representation). The computing device 1400 is configured to implement a business logic plus socio-technical behavior 1402 that is defined by a world metaphor 1404 in some examples. Using the business logic plus socio-technical behavior 1402, a world view interface 1406 is generated, which can be used to view the world view 402. For example, the business logic plus socio-technical behavior 1402 implements a visual language of the socio-technical network that has a metaphoric notion of a geo-world archetype based on the world metaphor 1404. The digital views of the world-model can be navigated and interrogated in 3D space and with time properties using the world view interface 1406. As described herein, the digital view of the world-model can be translated from 3D spherical to 2D planar for a “one-look” view.

The business logic plus socio-technical behavior 1402 in some examples defines domain properties represented as separate nodes (e.g., nodes 404 shown in FIG. 4) with centrality and modularity. Each domain property has associations/connections to other base-node domain properties and is incorporated into the knowledge graph as a unique layer to be turned "on" or "off" in the world-model in one example. Multiple domain property layers also can be turned on simultaneously in some examples, such as to see conflicts and/or derive new knowledge. In some examples, a game engine use utilized as the model host. Also, "world" alerts logic can be programmed in some examples.

It should be appreciated that the digital view of the world-model can be at various levels of abstraction. Thus, the visual language of the socio-technical network is expressed by digital views of the world-model.

Figure 15A:
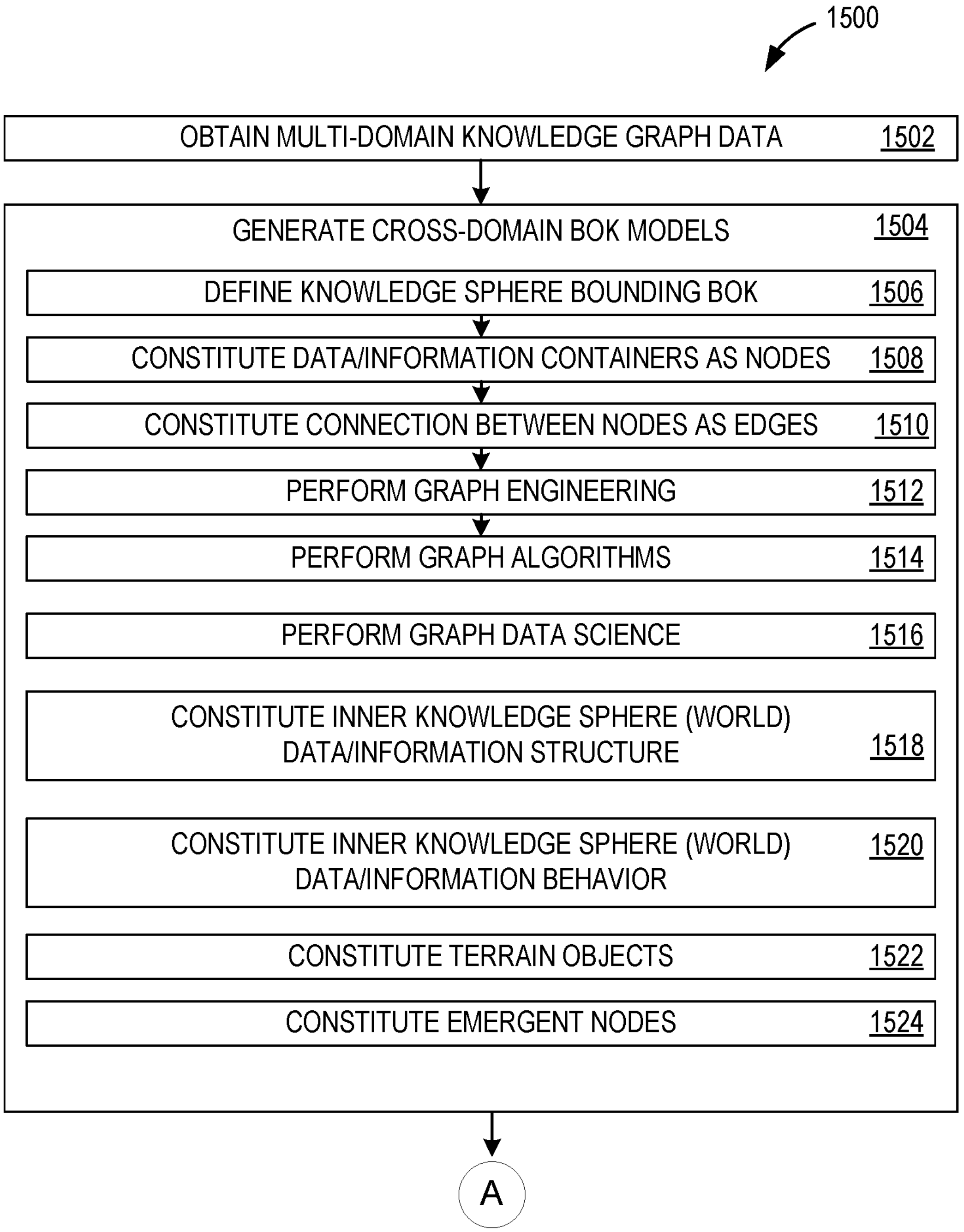
FIG. 15A-15B is a flowchart illustrating a method of cross-domain ontology modelling and generating of digital views according to an example.
Figure 15B:
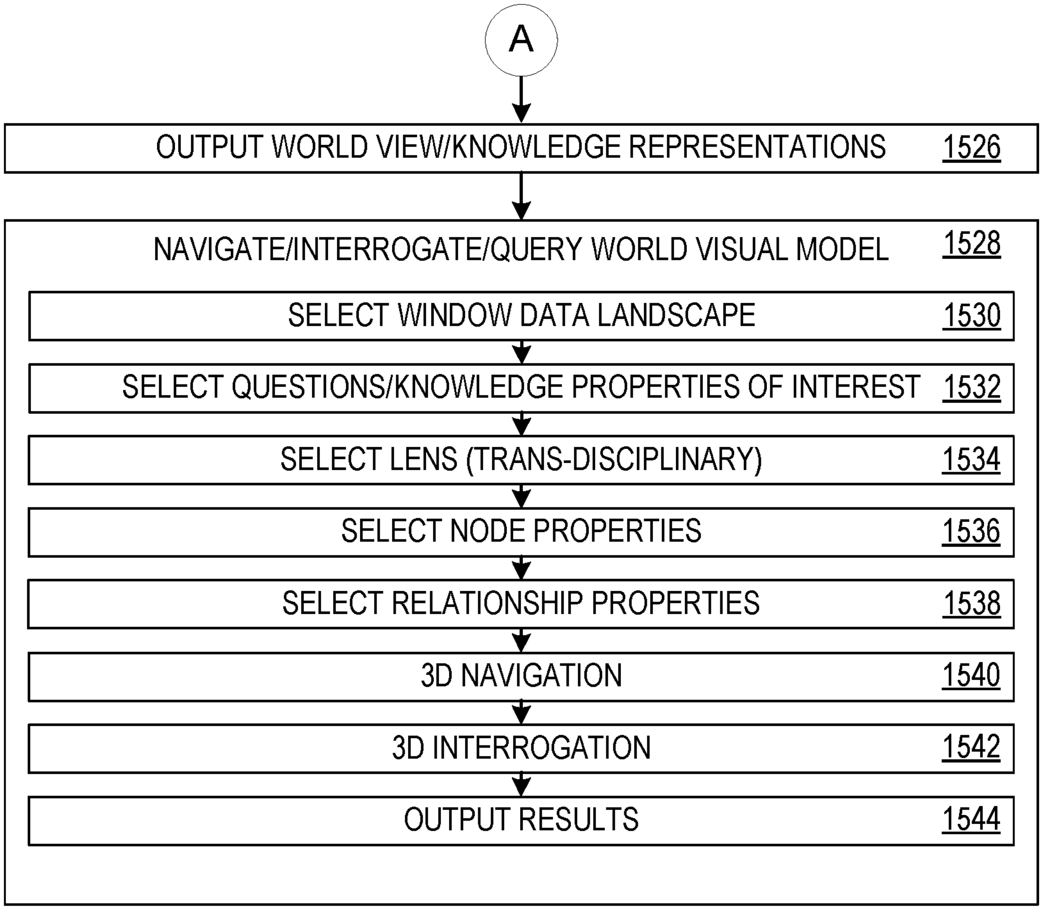

With reference now to FIG. 15, a flow chart 1500 illustrates a method of cross-domain ontology modelling and generating of digital views, such as digital representations of an organization as a system in a world metaphor (e.g., world metaphor digital twin model). In some examples, the operations illustrated in FIGS. 15A and 15B are performed, at least in part, by executing instructions 1602A (stored in the memory 1602) by the one or more processors 1604 of the computing device 1600 of FIG. 16. For example, a cross-domain ontology model is generated and then deployed in the operating environment that allows for navigating and interrogating the model. Operation 1502 includes obtaining multi-domain knowledge graph data. In some examples, the knowledge data is data relating to knowledge of individuals within an organization as described herein.

Operation 1504 includes generating one or more cross-domain BoK models using information properties and operations 1506-1524. In some examples, operation 1504 includes an iterative process. Operation 1506 includes defining knowledge sphere bounding the BoK for nodes within the knowledge graph that allows for ontologically connecting the nodes. For example, as described herein, the knowledge container is a bounding constraint for the knowledge of an individual, including tacit knowledge of the individual. In some examples, domain vocabularies are defined, such as using an end by end matrix, wherein each domain vocabulary is connected to every other domain vocabulary. All of the domains are processed within a single graph. In one example, the nodes have a set of defined properties (person-centric and/or intellectual capital centric), which in one example, includes the following: people, knowledge, social networks (organizations), systems, programs, workflows/business processes, tools, business metrics, customers, geography and time, among others.

Operation 1508 includes constituting data/information containers as nodes, and operation 1510 includes constituting connections between the nodes as edges. For example, as described herein, ontological connections are defined between the nodes using ontology model principles. In various examples, the ontological connections are cross-domain ontological connections.

Operation 1510 includes instantiating the taxonomy model 600, operation 1512 includes exercising graph theory, set theory and category theory performing graph engineering, operation 1514 includes performing graph mathematics and analytics algorithms, and operation 1516 includes performing graph data science. For example, as described herein, a knowledge container as a bounding container for knowledge internal and external to the organization as a system is defined. That is, the knowledge container is configured in a world metaphor definition in some examples to define a generally spherical data space in a digital view.

Operation 1518 includes constituting the inner knowledge sphere (World) data/information structure. For example, the connections of nodes 404 and edges 604 create a network structure defining the Body of Knowledge configuration inside the Knowledge Sphere bounding conditions.

Operation 1520 includes constituting inner knowledge sphere (World) data/information behavior. For example, the property-based influences the nodes 404 and edges 604 have on one another produce counter-influences and emergence of new behavior between the nodes and edges.

Operation 1522 includes constituting terrain objects. For example, as described herein, one or more objects corresponding to properties of nodes within the knowledge container are defined. The terrain objects allow for world metaphor visualization of the properties as defined by the ontological associations in some examples. The terrain objects may be governed for example, by the nodes ratings in centrality and/or modularity causing emergent behavior to restructure the network configuration.

Operation 1524 includes constituting emergent nodes. For example, if one or more nodes 404 are influences by one or more other nodes 404 or edges 604 in a matter that the resultant influence is the creation of a new node 404 with its own set of discrete properties.

Operation 1526 includes outputting world view/knowledge representations. For example, the world view interface 1406 (shown in FIG. 14) is configured to output cross-domain ontological model data that can be navigated and interrogated. These world views and or knowledge representations can be trans-disciplinary in nature and reflect a variety of properties of the internal-to-external transactions of the knowledge sphere.

Operation 1528 includes navigating/interrogating/querying the world visual model using operations 1530-1544. In some examples, operation 1528 includes maneuvering through the world view data and/or interrogating the world view data in a more intuit manner Operation 1530 includes selecting a window data landscape. For example, a portion of the world view for maneuvering through or interrogating is selected. That is, in one example, a world view (e.g., the world view 402 in FIG. 4) includes the world view data from operations 1506-1524. Thus, starting with the world view 402, a user can navigate/explore down to a terrain of the topology knowledge sphere 406 that defines the different properties of the data of the nodes 404, by "zooming" in (or zooming out) on the world view 402 and/or by selecting a data landscape, a particular sphere, a node, and/or connections between nodes.

Figure 7:
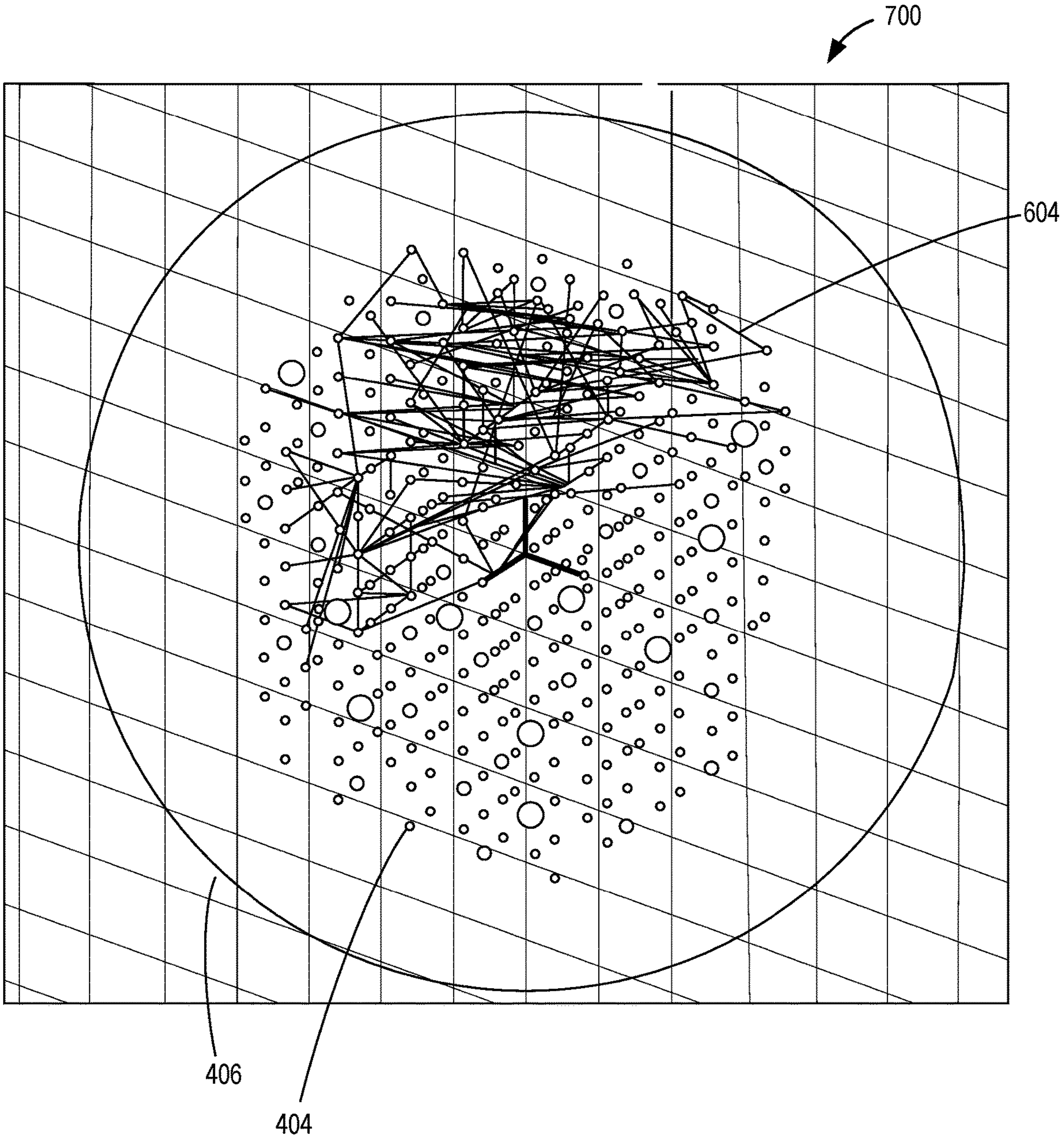
FIG. 7 illustrates a digital view of a 3D data knowledge sphere corresponding to an information/knowledge layer according to an example.

In another example, and as explained in more detail below with respect to operations 1528-1544, a user provides a query that, when entered, enables the world view 402 to automatically "zoom in" and/or display information (e.g., as shown in FIGS. 5-7) in a specific visual representation the user is able to easily understand with respect to the structure and behavior of the information shown (e.g., as shown in FIGS. 8-11, from which the user can initiate an additional query and/or navigate/explore without initiating a further query.

For example, a query from a user may request information relating to a particular division of a corporation, and more specifically, a request for critical knowledge points for a program in the division. In response to the query, a program node is automatically generated, and includes geometric indicators that represent distinctive skills, unique knowledge, etc. that are different colors and shapes based on different thresholds and values, providing the user with a visual representation (as a result of the query) of the critical knowledge points for the program the user can then navigate/explore and/or provide an additional query.

Operation 1532 includes selecting questions/knowledge properties of interest for navigating or interrogating the selected data landscape. For example, as described herein, maneuvering or query parameters are selected for identifying knowledge, such as tacit knowledge of individuals within the organization relating to a particular project.

Operation 1534 includes selecting a lens (trans-disciplinary). For example, constraints or granularity for the navigating or interrogating are defined, such as a knowledge lens to identify particular knowledge internal to the knowledge container. That is, the lens focuses the navigation or interrogation and is a single disciplinary or component/trans-disciplinary in some examples.

Operation 1536 includes selecting node properties. For example, the nodes have a set of defined properties (person-centric and/or intellectual capital centric), which in one example, includes the following: people, knowledge, social networks (organizations), systems, programs, workflows/business processes, tools, business metrics, customers, geography and time, among others.

Operation 1538 includes selecting relationship properties. For example, relationships between nodes is selected/determined as described in more detail herein. Operations 1540 and 1542 include 3D navigation and interrogation through the digital view of the knowledge container. As described herein, the navigation and/or interrogation can include maneuvering through nodes and connection within the knowledge container.

Operation 1544 includes outputting result. For example, answers to the queries are output or different options for navigation to solve a problem are determined.

In one or more examples, the operations are performed by a system, wherein the following is given:

a. Query set (questions);
b. Controlled domain vocabularies;
c. Taxonomies;
d. Ontological models;
e. Contextual data; and
f. Graph structures (Triples, graph DB, co-occurrence matrix, semantic graph, label-property graph, and the like).

The system is configured in some examples to perform one or more of the following:

a. Perform analytics on the ontological knowledge graph, processing the socio-technical network structure, to determine knowledge network properties to include but not limited to; centrality, modularity, closure, degree, structural holes, brokers, clustering, transitivity, and optimization.
b. Determine user persons via machine agents and logs to frame knowledge representation digital views and visual language for effective knowledge transfer.
individuals.
c. Align the query set with the generated graph structure and analytics outcome.
d. Define knowledge containers (nodes) as explicit and/or tacit knowledge of
e. Define knowledge path (edges) as co-occurrence data connections between knowledge container properties.
f. Define a knowledge sphere (outer shell) to scope the boundaries of the knowledge representation view
g. Define terrain objects (bordering shell surface) from compound nodes & reflect an expression of collective node metrics/modularity
h. Generate city objects on the surface of terrain nodes that express individual node properties/metrics/behaviors.
i. Enable Terrain objects and/or City objects to penetrate knowledge sphere container given properties (volume, priority) of internal node-to-external node behaviors/transactions.
j. Modify the visual representation of City objects, geometry and/or color, based on metric property thresholds.
k. Determine critical paths and optimization between plurality of nodes and city objects within the spherical container
l. Control navigation and interrogation of query sets, nodes, node paths, terrain objects, city objects, digital views, thresholds, and metrics.
m. Provide a knowledge "GPS" capability to navigate within the knowledge sphere
n. Provide knowledge representations in forms to include, but not limited to; single point status indicator, point numericals, linear connection data graph, roadmap Gantt, semantic graph, systemigram, knowledge graph, knowledge network illustration, circular Sankey plot, dimensional knowledge model, digital thread, or digital twin.

Thus, the defined terrain objects in some examples corresponds to one or more properties of the nodes and reflect an expression of one or more metrics for the nodes. The terrain objects can include, for example, one or more city objects that populate a surface of one or more nodes to reflect the expression of the one or more metrics, wherein the one or more city objects penetrate a volume of the spherical knowledge container based on a volume of external transactions. Critical paths can then be defined between a plurality of nodes within the spherical knowledge container and one or more user inputs define navigation or query parameters, and navigation or interrogation of the nodes is controlled based on the navigation or query parameters. It should be noted that the knowledge containers comprise explicit and/or tacit knowledge of the individuals.

Figure 16:
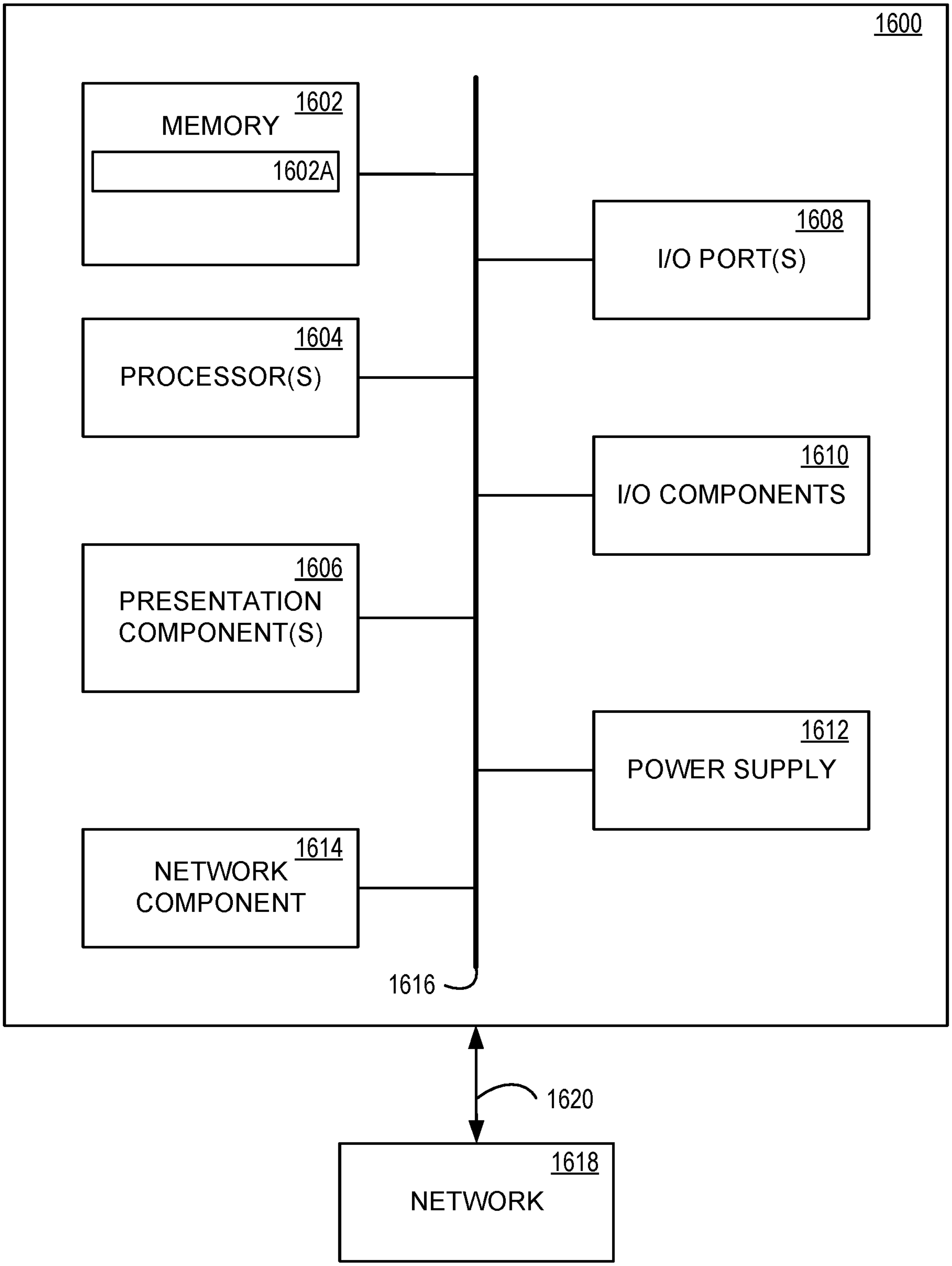
FIG. 16 is a block diagram of a computing device suitable for implementing various aspects of the disclosure according to an example.

With reference now to FIG. 16, a block diagram of the computing device 1600 suitable for implementing various aspects of the disclosure is described. In some examples, the computing device 1600 includes one or more processors 1604, one or more presentation components 1606 and the memory 1602. The disclosed examples associated with the computing device 1600 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 16 and the references herein to a "computing device." The disclosed examples are also practiced in distributed computing environments, where tasks are performed by remote-processing devices that are linked through a communications network. Further, while the computing device 1600 is depicted as a seemingly single device, in one example, multiple computing devices work together and share the depicted device resources. For instance, in one example, the memory 1602 is distributed across multiple devices, the processor(s) 1604 provided are housed on different devices, and so on.

In one example, the memory 1602 includes any of the computer-readable media discussed herein. In one example, the memory 1602 is used to store and access instructions 1602A configured to carry out the various operations disclosed herein. In some examples, the memory 1602 includes computer storage media in the form of volatile and/or nonvolatile memory, removable or non-removable memory, data disks in virtual environments, or a combination thereof. In one example, the processor(s) 1604 includes any quantity of processing units that read data from various entities, such as the memory 1602 or input/output (I/O) components 1610. Specifically, the processor(s) 1604 are programmed to execute computer-executable instructions for implementing aspects of the disclosure. In one example, the instructions are performed by the processor, by multiple processors within the computing device 1600, or by a processor external to the computing device 1600. In some examples, the processor(s) 1604 are programmed to execute instructions such as those illustrated in the flow charts discussed below and depicted in the accompanying drawings.

The presentation component(s) 1606 present data indications to an operator or to another device. In one example, presentation components 1606 include a display device, speaker, printing component, vibrating component, etc. One skilled in the art will understand and appreciate that computer data is presented in a number of ways, such as visually in a graphical user interface (GUI), audibly through speakers, wirelessly between the computing device 1600, across a wired connection, or in other ways. In one example, presentation component(s) 1606 are not used when processes and operations are sufficiently automated that a need for human interaction is lessened or not needed. I/O ports 1608 allow the computing device 1600 to be logically coupled to other devices including the I/O components 1610, some of which is built in. Implementations of the I/O components 1610 include, for example but without limitation, a microphone, keyboard, mouse, joystick, game pad, satellite dish, scanner, printer, wireless device, etc.

The computing device 1600 includes a bus 1616 that directly or indirectly couples the following devices: the memory 1602, the one or more processors 1604, the one or more presentation components 1606, the input/output (I/O) ports 1608, the I/O components 1610, a power supply 1612, and a network component 1614. The computing device 1600 should not be interpreted as having any dependency or requirement related to any single component or combination of components illustrated therein. The bus 1616 represents one or more busses (such as an address bus, data bus, or a combination thereof). Although the various blocks of FIG. 16 are shown with lines for the sake of clarity, some implementations blur functionality over various different components described herein.

In some examples, the computing device 1600 is communicatively coupled to a network 1618 using the network component 1614. In some examples, the network component 1614 includes a network interface card and/or computer-executable instructions (e.g., a driver) for operating the network interface card. In one example, communication between the computing device 1600 and other devices occur using any protocol or mechanism over a wired or wireless connection 1620. In some examples, the network component 1614 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 1600, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A system for generating a digital representation of an organization, the system comprising:

at least one processor; and at least one memory comprising computer program code, the at least one memory and the computer program code configured to, with the at least one processor, cause the at least one processor to:

obtain ontology and contextual data for a plurality of domains;

generate an ontological knowledge graph using the ontology and contextual data, the ontological knowledge graph comprising a plurality of nodes with links between the plurality of nodes and a plurality of terrain objects, each terrain object defined for a subset of the plurality of nodes and reflecting collective properties or metrics of the subset of nodes, the plurality of nodes and the plurality of terrain objects contained within a spherically represented data structure that acts as a boundary separating internal knowledge of the organization from external knowledge; and display, in a digital knowledge representation view, the plurality of nodes with the links and the plurality of terrain objects in a digital view within the spherically represented data structure.

2. The system of claim 1, wherein the computer program code is further configured to, with the at least one processor, cause the at least one processor to perform analytics on the ontological knowledge graph by processing a socio-technical network structure, to determine one or more knowledge network properties comprising centrality, modularity, closure, degree, structural holes, brokers, clustering, transitivity, and optimization.

3. The system of claim 2, wherein the computer program code is further configured to, with the at least one processor, cause the at least one processor to receive a query set and align the query set with the ontological knowledge graph and results of the performing of the analytics.

4. The system of claim 1, wherein the computer program code is further configured to, with the at least one processor, cause the at least one processor to determine user persons via one or more machine agents and logs to frame knowledge representation digital views and visual language.

5. The system of claim 1, wherein the computer program code is further configured to, with the at least one processor, cause the at least one processor to define knowledge containers as the plurality of nodes, the knowledge containers representing at least on of explicit or tacit knowledge of a plurality of individuals.

6. The system of claim 5, wherein the computer program code is further configured to, with the at least one processor, cause the at least one processor to define a plurality of knowledge paths forming edges as co-occurrence data connections between one or more properties of the knowledge containers.

7. The system of claim 1, wherein at least one terrain object of the plurality of terrain objects comprises one or more city objects, each city object representing one or more of individual node properties, metrics, and behaviors of an individual node in the subset of nodes corresponding to the terrain object.

8. The system of claim 7, wherein the computer program code is further configured to, with the at least one processor, cause the at least one processor to enable the at least one terrain object and the one or more city objects to penetrate the spherical knowledge container given properties of internal node-to-external node behaviors and transactions including at least one of volume or priority.

9. The system of claim 7, wherein the computer program code is further configured to, with the at least one processor, cause the at least one processor to modify a visual representation of the one or more city objects, geometry and color, based on one or more metric property thresholds.

10. The system of claim 7, wherein the computer program code is further configured to, with the at least one processor, cause the at least one processor to determine one or more critical paths and optimization between the plurality of nodes and the one or more city objects within the spherical knowledge container.

11. The system of claim 7, wherein the computer program code is further configured to, with the at least one processor, cause the at least one processor to control navigation and interrogation of one or more of query sets, nodes, node paths, terrain objects, city objects, digital views, thresholds, and metrics.

12. The system of claim 7, wherein the computer program code is further configured to, with the at least one processor, cause the at least one processor to provide a global positioning system capability to navigate within the spherical knowledge container.

13. The system of claim 1, wherein the computer program code is further configured to, with the at least one processor, cause the at least one processor to provide knowledge representations in one or more forms comprising a single point status indicator, point numericals, a linear connection data graph, a roadmap Gantt, a semantic graph, a systemigram, a knowledge graph, a knowledge network illustration, a circular Sankey plot, dimensional knowledge model, digital thread, or digital twin.

14. A computerized method for generating a digital representation of an organization, the computerized method comprising:

obtaining ontology and contextual data for a plurality of domains;

generating an ontological knowledge graph using the ontology and contextual data, the ontological knowledge graph comprising a plurality of nodes with links between the plurality of nodes and a plurality of terrain objects, each terrain object defined for a subset of the plurality of nodes and reflecting collective properties or metrics of the subset of nodes, the plurality of nodes and the plurality of terrain objects contained within a spherically represented data structure that acts as a boundary separating internal knowledge of the organization from external knowledge; and displaying, in a digital knowledge representation view, the plurality of nodes with the links and the plurality of terrain objects in a digital view within the spherically represented data structure.

15. The computerized method of claim 14, further comprising performing analytics on the ontological knowledge graph by processing a socio-technical network structure, to determine one or more knowledge network properties comprising centrality, modularity, closure, degree, structural holes, brokers, clustering, transitivity, and optimization.

16. The computerized method of claim 14, further comprising defining knowledge containers as the plurality of nodes, the knowledge containers representing at least on of explicit or tacit knowledge of a plurality of individuals.

17. The computerized method of claim 14, wherein at least on terrain object of the plurality of terrain objects comprises one or more city objects, each city object indicative of one or more of individual node properties, metrics, and behaviors, and further comprising controlling navigation and interrogation of one or more of query sets, nodes, node paths, terrain objects, city objects, digital views, thresholds, and metrics.

18. A computer memory storing computer readable program code embodied therein, the computer readable program code adapted to be executed by one or more processors to implement a method of generating a digital representation of an organization, the method comprising:

obtaining ontology and contextual data for a plurality of domains;

generating an ontological knowledge graph using the ontology and contextual data, the ontological knowledge graph comprising a plurality of nodes with links between the plurality of nodes and a plurality of terrain objects, each terrain object defined for a subset of the plurality of nodes and reflecting collective properties or metrics of the subset of nodes, the plurality of nodes and the plurality of terrain objects contained within a spherically represented data structure that acts as a boundary separating internal knowledge of the organization from external knowledge; and displaying, in a digital knowledge representation view, the plurality of nodes with the links and the plurality of terrain objects in a digital view within the spherically represented data structure.

19. The computer memory of claim 18, wherein the computer readable program code is further configured to, with the one or more processors, cause the at least one processor to perform analytics on the ontological knowledge graph by processing a socio-technical network structure, to determine one or more knowledge network properties comprising centrality, modularity, closure, degree, structural holes, brokers, clustering, transitivity, and optimization.

20. The computer memory of claim 19, wherein the computer readable program code is further configured to, with the one or more processors, cause the at least one processor to receive a query set and align the query set with the ontological knowledge graph and results of the performing of the analytics.

* * * * *